United States Patent
Lim et al.

(10) Patent No.: US 12,432,704 B2
(45) Date of Patent: Sep. 30, 2025

(54) SIDELINK COMMUNICATION

(71) Applicant: LG ELECTRONICS INC., Seoul (KR)

(72) Inventors: Suhwan Lim, Seoul (KR); Yoonoh Yang, Seoul (KR); Sangwook Lee, Seoul (KR); Jaehyuk Jang, Seoul (KR); Jinyup Hwang, Seoul (KR); Jinwoong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 736 days.

(21) Appl. No.: 17/662,597

(22) Filed: May 9, 2022

(65) Prior Publication Data

US 2022/0361168 A1 Nov. 10, 2022

(30) Foreign Application Priority Data

May 10, 2021 (KR) .......................... 10-2021-0059688
Aug. 6, 2021 (KR) .......................... 10-2021-0103867

(51) Int. Cl.
*H04W 72/0446* (2023.01)

(52) U.S. Cl.
CPC .............................. *H04W 72/0446* (2013.01)

(58) Field of Classification Search
CPC . H04W 72/0446; H04W 76/16; H04W 72/20; H04W 76/14; H04W 76/15; H04W 92/18; H04W 72/535; H04W 4/40; H04W 72/0453; H04W 72/541; H04W 72/563; H04W 92/10; H04L 5/0037; H04L 27/26025; H04L 5/0044; Y02D 30/70; H04B 17/203
See application file for complete search history.

(56) References Cited

U.S. PATENT DOCUMENTS

| | | | | |
|---|---|---|---|---|
| 10,349,360 | B2 * | 7/2019 | Lee | H04W 52/346 |
| 10,849,056 | B2 * | 11/2020 | Kim | H04W 48/20 |
| 11,825,501 | B2 * | 11/2023 | Lovlekar | H04W 88/06 |
| 11,968,629 | B2 * | 4/2024 | Yang | H04W 52/242 |
| 12,035,400 | B2 * | 7/2024 | Lim | H04W 76/16 |
| 12,144,056 | B2 * | 11/2024 | Wu | H04W 52/0216 |
| 2019/0253982 | A1 * | 8/2019 | Lee | H04W 52/383 |

(Continued)

FOREIGN PATENT DOCUMENTS

WO        2020-197129       10/2020

OTHER PUBLICATIONS

Catt et al. ("CR for TS38. 101-1, Introduce Rx RF requirements for NR V2X con-current operation", 3GPP TSG-RAN WG4 Meeting #95-e , R4-2006263, May-Jun. 2020, 4 pages (Year: 2020).*

(Continued)

*Primary Examiner* — Brian T O Connor
(74) *Attorney, Agent, or Firm* — LEE, HONG, DEGERMAN, KANG & WAIMEY

(57) ABSTRACT

There is provided a UE for configured to perform communication. The UE comprises: at least one transceiver; at least one processor; and at least one computer memory operably connectable to the at least one processor and storing instructions that, based on being executed by the at least one processor, perform operations comprising: receiving a SL signal based on NR operating band n79; and performing NR Uu communication based on the NR operating band n79.

6 Claims, 28 Drawing Sheets

(56) References Cited

U.S. PATENT DOCUMENTS

| | | |
|---|---|---|
| 2020/0245329 A1 | 7/2020 | Lim et al. |
| 2022/0312543 A1* | 9/2022 | Wu .................. H04W 52/0216 |
| 2024/0349397 A1* | 10/2024 | Wu .................. H04W 52/0216 |

OTHER PUBLICATIONS

Korean Intellectual Property Office Application No. 10-2023-7014337, Notice of Allowance dated Dec. 4, 2023, 3 pages.

3rd Generation Partnership Project, "Technical Specification Group Radio Access Network; NR Sidelink enhancement; User Equipment (UE) radio transmission and reception; (Release 17)," 3GPP TR 38.785 V0.1.0, Apr. 2021, 25 pages.

"TR38.785 v0.1.0: TR Update for SL enhancement in Rel-17," R4-2104969, 3GPP TR 38.785 V0.1.0, RAN4 Meeting #98BIS-e, Apr. 2021, 26 pages.

CATT, "Discussion on switching period in ITS band for NR V2X," R4-2006248, 3GPP TSG-RAN WG4 Meeting #95-e, Electronic Meeting, Jun. 2020, 2 pages.

PCT International Application No. PCT/KR2022/006605, International Search Report dated Aug. 12, 2022, 3 pages.

3rd Generation Partnership Project, "Technical Specification Group Radio Access Network; NR; User Equipment (UE) conformance specification; Radio transmission and reception; Part 1: Range 1 Standalone; (Release 17)," 3GPP TS 38.521-1 V17.0.0, Mar. 2021, 1073 pages.

3rd Generation Partnership Project, "Technical Specification Group Radio Access Network; Evolved Universal Terrestrial Radio Access (E-UTRA); User Equipment (UE) radio transmission and reception (Release 17)," 3GPP TS 36.101 V17.1.0, Mar. 2021, 630 pages.

3rd Generation Partnership Project, "Technical Specification Group Radio Access Network; NR; Requirements for support of radio resource management (Release 16)," 3GPP TS 38.133 V16.7.0, Mar. 2021, 200 pages.

3rd Generation Partnership Project, "Technical Specification Group Radio Access Network; NR; User Equipment (UE) radio transmission and reception; Part 1: Range 1 Standalone (Release 17)," 3GPP TS 38.101-1 V17.1.0, Mar. 2021, 513 pages.

Korean Intellectual Property Office Application No. 10-2023-7014337, Office Action dated Sep. 13, 2023, 4 pages.

Catt et al., "CR for TS38.101-1, Introduce Rx RF requirements for NR V2X con-current operation," 3GPP TSG-RAN WG4 Meeting #95-e, R4-2006263, May-Jun. 2020, 4 pages.

* cited by examiner (a)

(b)

SIDELINK COMMUNICATION

CROSS-REFERENCE TO RELATED APPLICATIONS

Pursuant to 35 U.S.C. § 119 (a), this application claims the benefit of an earlier filing date and right of priority to Korean Patent Application Nos. 10-2021-0059688, filed on May 10, 2021, and 10-2021-0103867, filed on Aug. 6, 2021, the contents of which are all hereby incorporated by reference herein in their entireties.

TECHNICAL FIELD

The present disclosure relates to mobile communication.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Currently, in NR V2X, single carrier V2X operation and inter-band con-current operation of NR Uu and NR sidelink was defined to be supported. However, simultaneous operation of NR Uu and NR SL within the same band was not supported.

In the case of a con-current operation in which NR Uu and NR SL are operated simultaneously within the same band, interference due to a difference in transmission time between each other may affect the reception of a magnetic signal (NR SL signal or NR Uu signal). A method is needed to remove/solve it, so Time Division Multiplexing (TDM) operation can support services of both NR Uu and NR SL without interference. In Frequency Division Multiplexing (FDM), interference can be reduced by performing simultaneous Tx/Rx operation based on a frequency gap for non-contiguous channels, however, performing simultaneous Tx/Rx operation based on a frequency gap is impossible for an adjacent channels For example, when a terminal operates based on NR SL and NR Uu in different time domain based on switching in different adjacent carriers, ON/OFF time mask was not defined. Also, when the terminal operates under this assumption, requirements for a terminal's aspect was not defined.

For example, when a terminal operates based on NR SL and NR Uu in different time domain based on switching in same carrier, transient period time mask was not defined. Also, when the terminal operates under this assumption, requirements for a terminal's aspect was not defined.

For example, when a terminal operates based on an adjacent channels when it is impossible to have a frequency gap between NR Uu and NR SL during FDM operation, a method for reducing an interference was not studied. Also, requirements for a terminal's aspect were not defined. Operating based on NR SL and NR Uu in different time domain can be considered.

For example, requirements related to reference sensitivity for intra-band con-current operation of NR SL and NR Uu was not clearly defined.

SUMMARY

Accordingly, a disclosure of the present specification has been made in an effort to solve the aforementioned problem.

Accordingly, a disclosure of the present specification has been made in an effort to solve the aforementioned problem.

In accordance with an embodiment of the present disclosure, a disclosure of the present specification provides a UE, the UE comprising: at least one transceiver; at least one processor; and at least one computer memory operably connectable to the at least one processor and storing instructions that, based on being executed by the at least one processor, perform operations comprising: receiving a SL signal based on NR operating band n79; and performing NR Uu communication based on the NR operating band n79.

In accordance with an embodiment of the present disclosure, a disclosure of the present specification provides a method for performing communication. The method is performed by a UE and comprising: receiving a SL signal based on NR operating band n79; and performing NR Uu communication based on the NR operating band n79.

In accordance with an embodiment of the present disclosure, a disclosure of the present specification provides wireless communication device, the wireless communication device comprising: at least processor; and at least one computer memory operably connectable to the at least one processor, wherein the at least one processor is configured to perform operations comprising: receiving a SL signal based on NR operating band n79; and performing NR Uu communication based on the NR operating band n79.

In accordance with an embodiment of the present disclosure, a disclosure of the present specification provides CRM storing instructions that, based on being executed by at least one processor, perform operations comprising: identifying a Sidelink (SL) signal based on New Radio (NR) operating band n79; and performing NR Uu communication based on the NR operating band n79.

In accordance with an embodiment of the present disclosure, a disclosure of the present specification provides a UE, the UE comprising: at least one transceiver; at least one processor; and at least one computer memory operably connectable to the at least one processor and storing instructions that, based on being executed by the at least one processor, perform operations comprising: performing NR SL communication via first slot; performing switching operation from the NR SL communication to NR Uu communication; and performing the NR Uu communication via second slot after the first slot.

In accordance with an embodiment of the present disclosure, a disclosure of the present specification provides a method for performing communication. The method is performed by a UE and comprising: performing NR SL communication via first slot; performing switching operation from the NR SL communication to NR Uu communication; and performing the NR Uu communication via second slot after the first slot.

According to a disclosure of the present disclosure, the above problem of the related art is solved.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
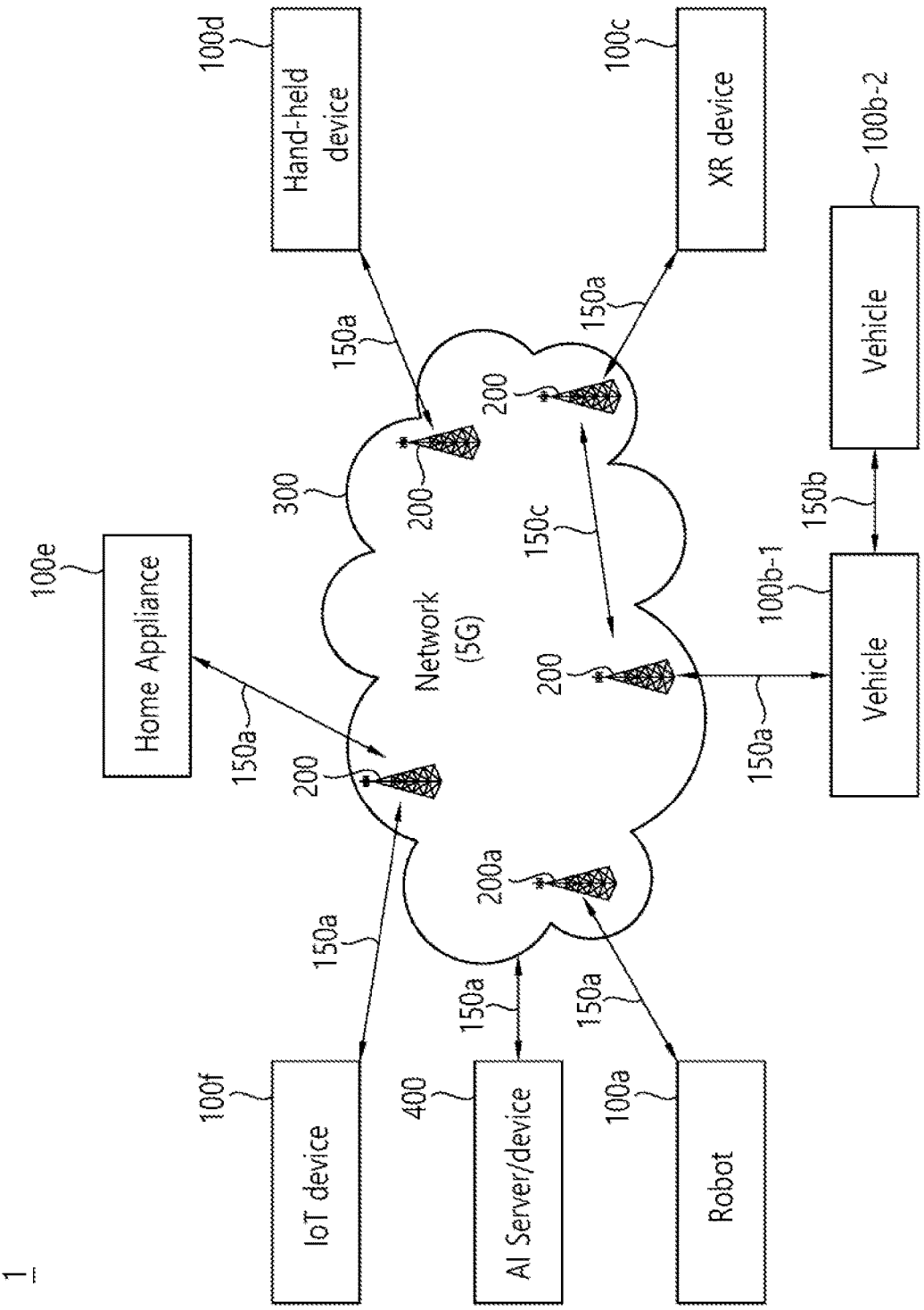
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Although user equipment (UE) is illustrated in the accompanying drawings by way of example, the illustrated UE may be referred to as a terminal, mobile equipment (ME), and the like. In addition, the UE may be a portable device such as a notebook computer, a mobile phone, a PDA, a smart phone, a multimedia device, or the like, or may be a non-portable device such as a PC or a vehicle-mounted device.

Hereinafter, the UE is used as an example of a wireless communication device (or a wireless device, or a wireless apparatus) capable of wireless communication. An operation performed by the UE may be performed by a wireless communication device. A wireless communication device may also be referred to as a wireless device, a wireless device, or the like.

A base station, a term used below, generally refers to a fixed station that communicates with a wireless device. The base station may be referred to as another term such as an evolved-NodeB (eNodeB), an evolved-NodeB (eNB), a BTS (Base Transceiver System), an access point (Access Point), gNB (Next generation NodeB), etc.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW). FR2 may include FR 2-1 and FR 2-2 as shown in Examples of Table 1 and Table 2.

TABLE 1

| Frequency Range designation | | Corresponding frequency range | Subcarrier Spacing |
| --- | --- | --- | --- |
| FR1 | | 450 MHz-6000 MHz | 15, 30, 60 kHz |
| FR2 | FR2-1 | 24250 MHz-52600 MHz | 60, 120, 240 kHz |
| | FR2-2 | 57000 MHz-71000 MHz | 120, 480, 960 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | | Corresponding frequency range | Subcarrier Spacing |
| --- | --- | --- | --- |
| FR1 | | 410 MHz-7125 MHz | 15, 30, 60 kHz |
| FR2 | FR2-1 | 24250 MHz-52600 MHz | 60, 120, 240 kHz |
| | FR2-2 | 57000 MHz-71000 MHz | 120, 480, 960 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
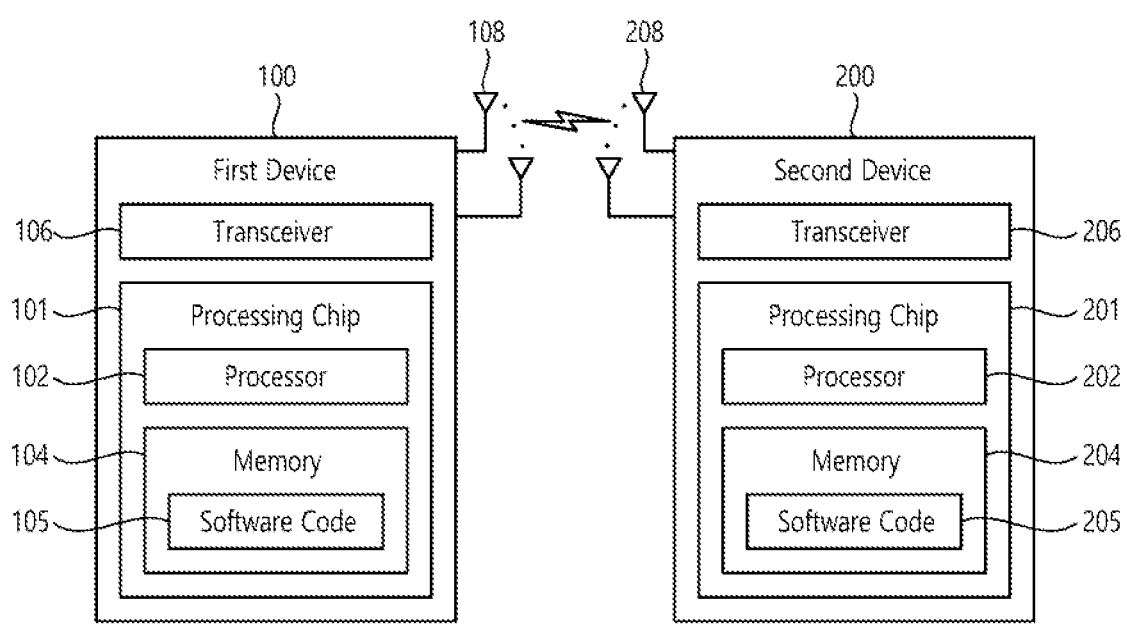
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
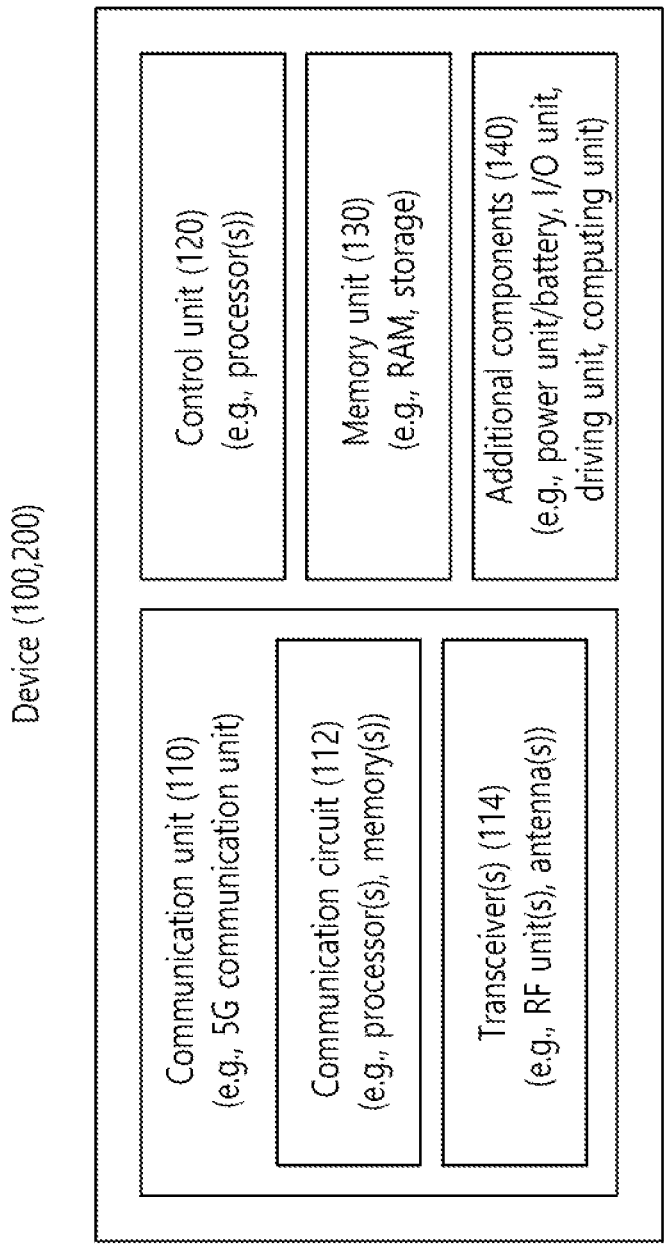
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

<Dual Connectivity (DC)>

Recently, a scheme for simultaneously connecting UE to different base stations, for example, a macro cell base station and a small cell base station, is being studied. This is called dual connectivity (DC).

For example, when DC is configured in E-UTRA, the following exemplary description may be applied.

In DC, the eNodeB for the primary cell (PCell) may be referred to as a master eNodeB (hereinafter referred to as MeNB). In addition, the eNodeB only for the secondary cell (Scell) may be referred to as a secondary eNodeB (hereinafter referred to as SeNB).

A cell group including a primary cell (PCell) implemented by MeNB may be referred to as a master cell group (MCG) or PUCCH cell group 1. A cell group including a secondary cell (Scell) implemented by the SeNB may be referred to as a secondary cell group (SCG) or PUCCH cell group 2.

Meanwhile, among the secondary cells in the secondary cell group (SCG), a secondary cell in which the UE can transmit Uplink Control Information (UCI), or the secondary cell in which the UE can transmit a PUCCH may be referred to as a super secondary cell (Super SCell) or a primary secondary cell (Primary Scell; PScell).

Figure 4A:
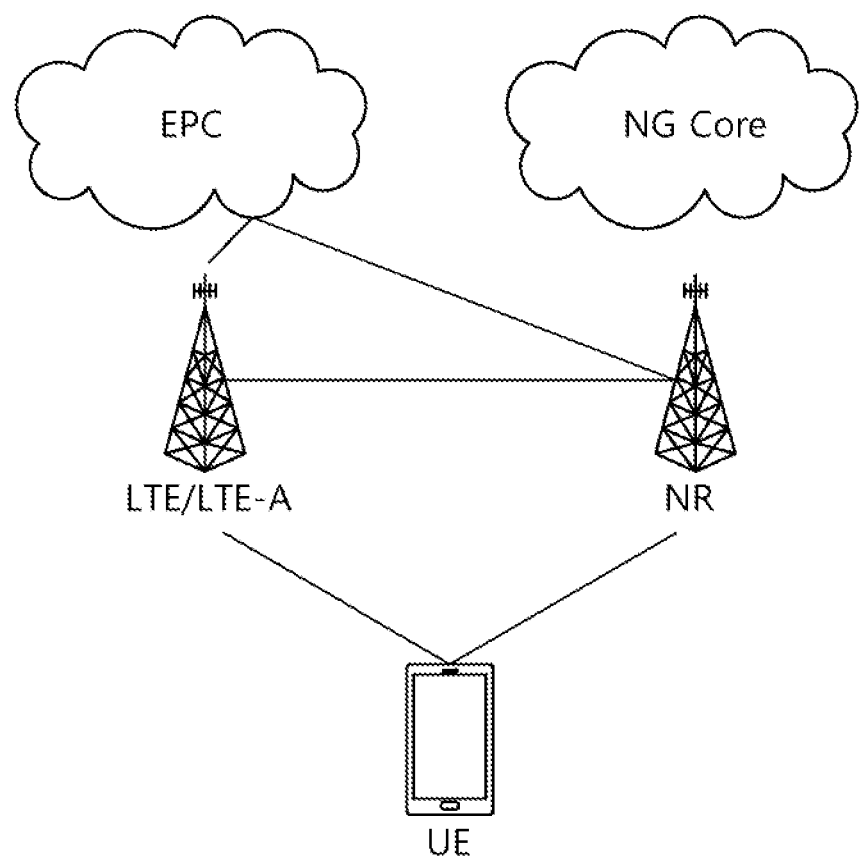
FIGS. 4a to 4c are diagrams illustrating exemplary architecture for a next-generation mobile communication service.
Figure 4B:
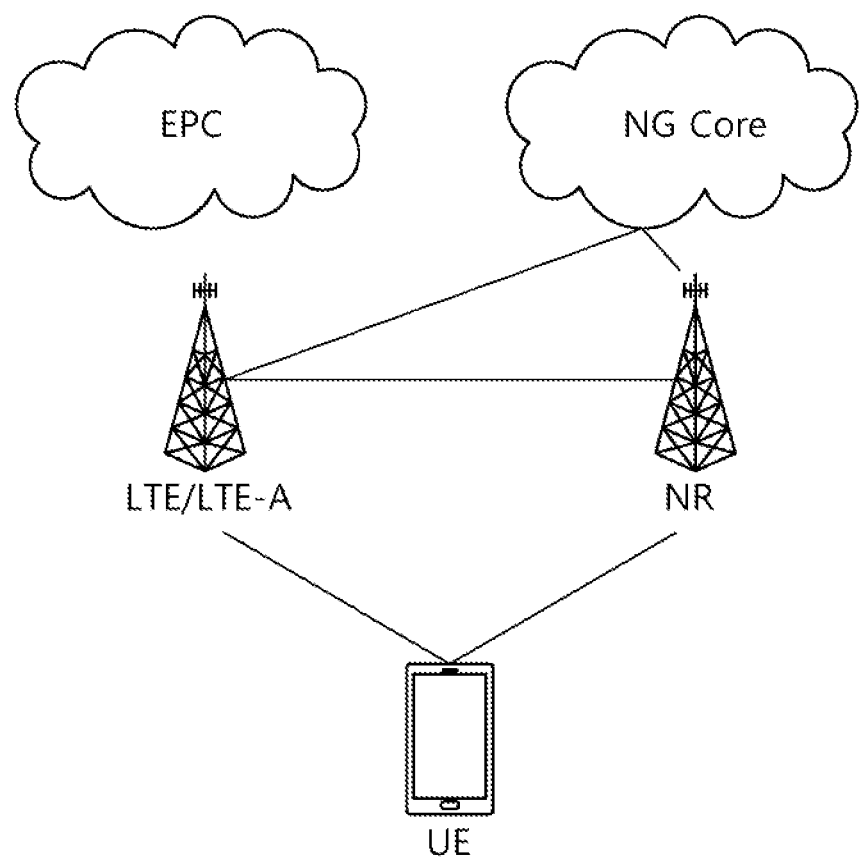
Figure 4C:
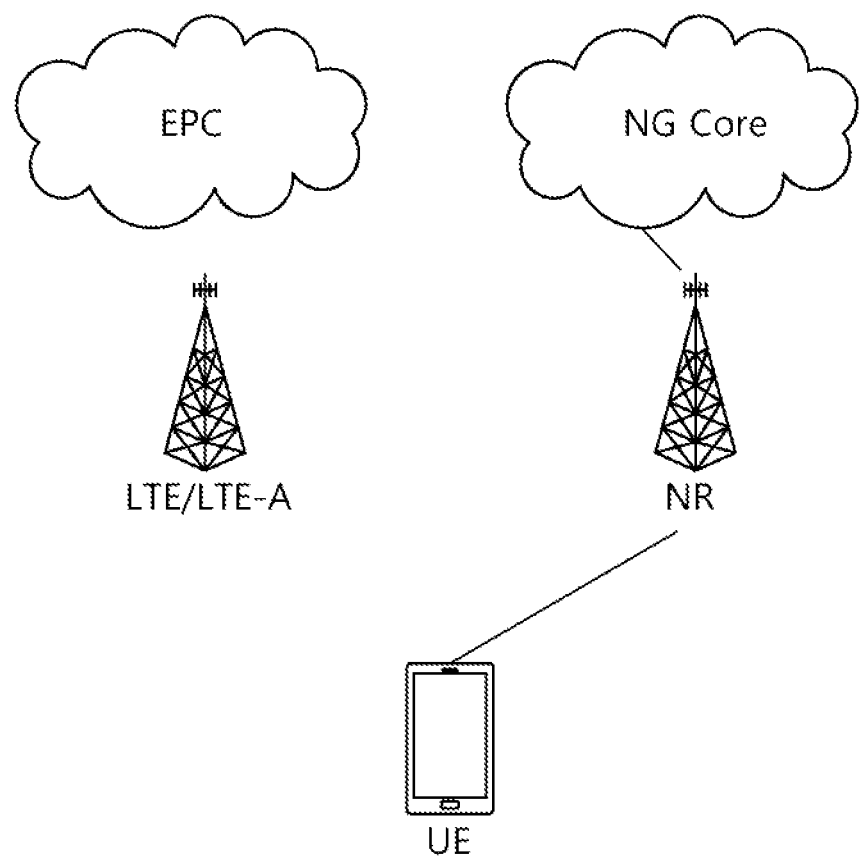

FIGS. 4a to 4c are diagrams illustrating exemplary architecture for a next-generation mobile communication service.

Referring to FIG. 4a, a UE is connected in dual connectivity (DC) with an LTE/LTE-A cell and a NR cell.

The NR cell is connected with a core network for the legacy fourth-generation mobile communication, that is, an Evolved Packet core (EPC). In example shown in FIG. 4a, the UE is configured with EN-DC (E-UTRA-NR DC). The UE, which is configured with EN-DC, is connected with an E-UTRA (that is, LTE/LTE-A) cell and an NR cell. Here, a PCell in EN-DC may be an E-UTRA (that is, LTE/LTE-A) cell, and a PSCell in EN-DC may be an NR cell.

Referring to FIG. 4b, the LTE/LTE-A cell is connected with a core network for 5th generation mobile communication, that is, a Next Generation (NG) core network, unlike the example in FIG. 4a.

A service based on the architecture shown in FIGS. 4a and 4b is referred to as a non-standalone (NSA) service.

Referring to FIG. 4c, a UE is connected only with an NR cell. A service based on this architecture is referred to as a standalone (SA) service.

Meanwhile, in the above new radio access technology (NR), using a downlink subframe for reception from a base station and using an uplink subframe for transmission to the base station may be considered. This method may be applied to paired spectrums and not-paired spectrums. A pair of spectrum indicates including two subcarrier for downlink and uplink operations. For example, one subcarrier in one pair of spectrum may include a pair of a downlink band and an uplink band.

<V2X or SL Communication>

Hereinafter, Vehicle to Everything (V2X) or Sidelink (SL) communication will be described.

Figure 5:
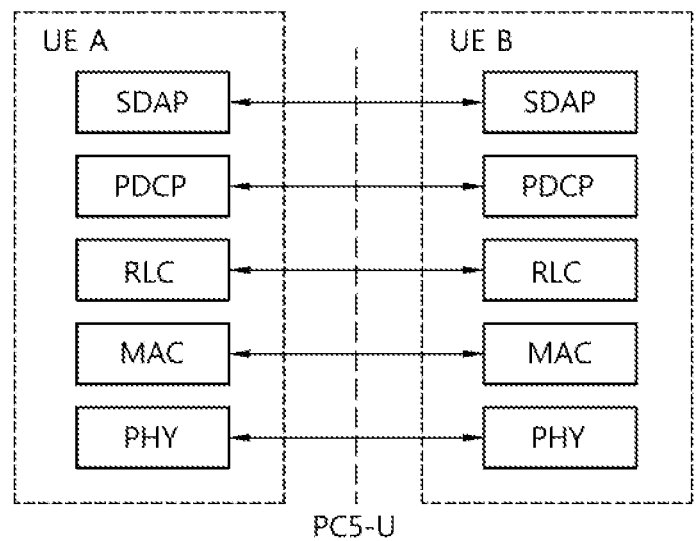
FIG. 5 shows a radio protocol architecture for a SL communication, based on an embodiment of the present disclosure.
Figure 5:
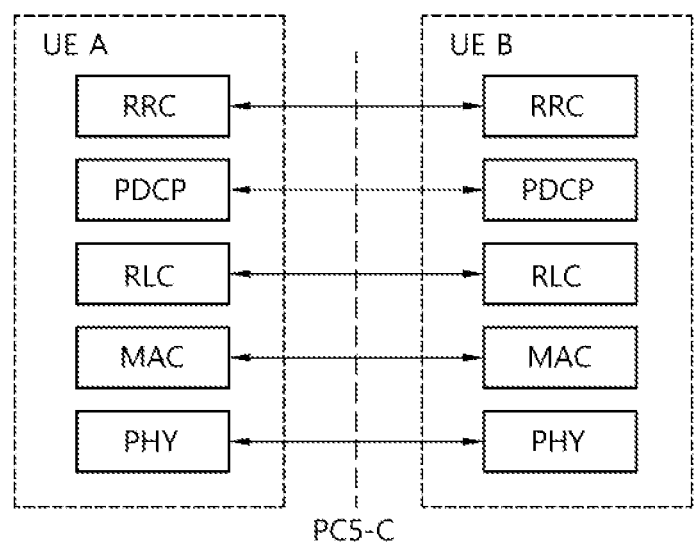

FIG. 5 shows a radio protocol architecture for a SL communication, based on an embodiment of the present disclosure.

The embodiment of FIG. 5 may be combined with various embodiments of the present disclosure. More specifically, FIG. 5(a) shows a user plane protocol stack, and FIG. 5(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
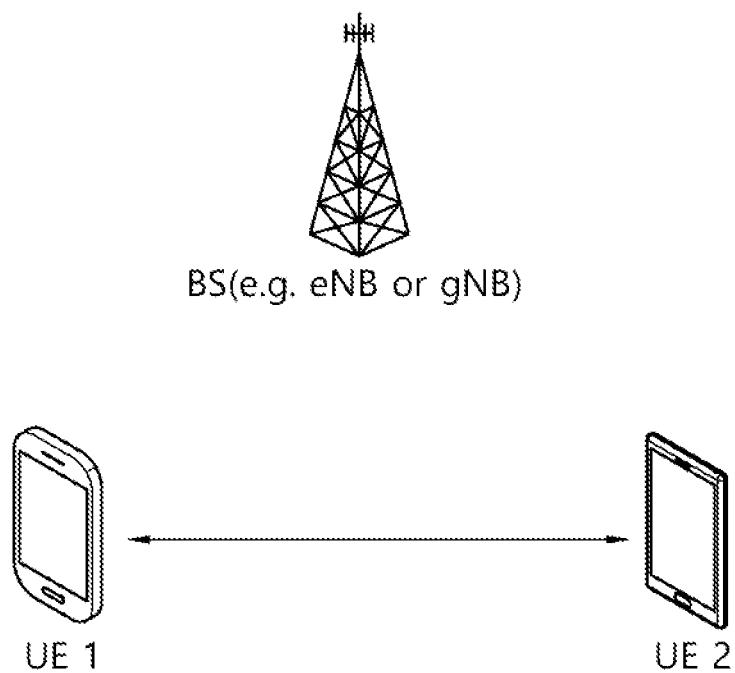
FIG. 6 shows a UE performing V2X or SL communication, based on an embodiment of the present disclosure.

FIG. 6 shows a UE performing V2X or SL communication, based on an embodiment of the present disclosure.

The embodiment of FIG. 6 may be combined with various embodiments of the present disclosure.

Referring to FIG. 6, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit a SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

<Operating Band in NR>

An operating band shown in Table 3 is a reframing operating band that is transitioned from an operating band of LTE/LTE-A. This operating band is referred to as FR band.

TABLE 3

| NR Operating Band | Uplink Operating Band $F_{UL\_low}$-$F_{UL\_high}$ | Downlink Operating Band $F_{DL\_low}$-$F_{DL\_high}$ | Duplex Mode |
| --- | --- | --- | --- |
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n25 | 1850 MHz-1915 MHz | 1930 MHz-1995 MHz | FDD |
| n26 | 814 MHz-849 MHz | 859 MHz-894 MHz | FDD |

TABLE 3-continued

| NR Operating Band | Uplink Operating Band $F_{UL\_low}$-$F_{UL\_high}$ | Downlink Operating Band $F_{DL\_low}$-$F_{DL\_high}$ | Duplex Mode |
|---|---|---|---|
| n28 | 703 MHz-748 MHz | 758 MHz-803 MHz | FDD |
| n29 | N/A | 717 MHz-728 MHz | SDL |
| n30 | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n46 | 5150 MHz-5925 MHz | 5150 MHz-5925 MHz | TDD |
| n47 | 5855 MHz-5925 MHz | 5855 MHz-5925 MHz | TDD |
| n48 | 3550 MHz-3700 MHz | 3550 MHz-3700 MHz | TDD |
| n50 | 1432 MHz-1517 MHz | 1432 MHz-1517 MHz | TDD1 |
| n51 | 1427 MHz-1432 MHz | 1427 MHz-1432 MHz | TDD |
| n53 | 2483.5 MHz-2495 MHz | 2483.5 MHz-2495 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |
| n89 | 824 MHz-849 MHz | N/A | SUL |
| n90 | 2496 MHz-2690 MHz | 2496 MHz-2690 MHz | TDD |
| n91 | 832 MHz-862 MHz | 1427 MHz-1432 MHz | FDD |
| n92 | 832 MHz-862 MHz | 1432 MHz-1517 MHz | FDD |
| n93 | 880 MHz-915 MHz | 1427 MHz-1432 MHz | FDD |
| n94 | 880 MHz-915 MHz | 1432 MHz-1517 MHz | FDD |
| n95 | 2010 MHz-2025 MHz | N/A | SUL |
| n96 | 5925 MHz-7125 MHz | 5925 MHz-7125 MHz | TDD |

The following table shows an NR operating band defined at high frequencies. This operating band is referred to as FR2 band.

TABLE 4

| NR Operating Band | Uplink Operating Band $F_{UL\_low}$-$F_{UL\_high}$ | Downlink Operating Band $F_{DL\_low}$-$F_{DL\_high}$ | Duplex Mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 39500 MHz-43500 MHz | 39500 MHz-43500 MHz | TDD |
| n260 | 37000 MHz-40000 MHz | 37000 MHz-40000 MHz | TDD |
| n261 | 27500 MHz-28350 MHz | 27500 MHz-28350 MHz | TDD |
| n262 | 47200 MHz-48200 MHz | 47200 MHz-48200 MHz | TDD |
| n263 | 57000 MHz-71000 MHz | 57000 MHz-71000 MHz | TDD |

Disclosure of the Present Specification

In the case of a con-current operation in which NR Uu and NR SL are operated simultaneously, interference due to a difference in transmission time between each other may affect the reception of a magnetic signal (NR SL signal or NR Uu signal). A method is needed to remove it, so Time Division Multiplexing (TDM) operation can support services of both NR Uu and NR SL without interference. In Frequency Division Multiplexing (FDM), interference can be reduced by performing simultaneous Tx/Rx operation based on a frequency gap.

For example, when a terminal operates based on an adjacent channels when it is impossible to have a frequency gap between NR Uu and NR SL during FDM operation, a method for reducing an interference was not studied. Also, requirements for a terminal's aspect were not defined. Disclosure of the present specification proposes the method for reducing the interference and requirements for the terminal's aspects.

For example, when a terminal operates based on NR SL and NR Uu in different time domain based on switching in different adjacent carriers, ON/OFF time mask was not defined. Also, when the terminal operates under this assumption, requirements for a terminal's aspect was not defined. Disclosure of the present specification proposes ON/OFF time mask and requirements for the terminal's aspects.

For example, requirements related to reference sensitivity for intra-band con-current operation of NR SL and NR Uu was not clearly defined. Disclosure of the present specification proposes requirements related to reference sensitivity for intra-band con-current operation.

1. First Example of the Disclosure of the Present Specification

The priority for V2X operating scenarios in a licensed band and impact of RF requirements needs to be studied. The following examples of scenarios may be considered:
Prioritization on operating scenarios including TDM and FDM may be considered:
1st priority: TDM (Single RF chain for Tx as baseline)
2nd priority: FDM with adjacent carrier (Separate RF chain as baseline)
3rd priority: FDM with non-adjacent carrier (Separate RF chain as baseline)
TDM operation between spectrally partially used PC5 SL and Uu UL/DL operation in a licensed TDD band regardless of adjacent/non-adjacent carrier may be allowed (Option 1 may be considered first). The following examples of options may be considered for frequency separation for non-adjacent carriers:
Option 1: For the FDD/TDD intra-band con-current operation with non-adjacent carrier, the detail coexistence scenarios based on operator deployment scenarios and request need to be discussed.
Option 2: No need to introduce the frequency separation for the case, in which Uu and SL are in different channels for intra-band con-current operation.
Option 3: To study the frequency separation in non-adjacent channel, the frequency separation between existing UL and DL of FDD bands can be considered as a starting point.

In the disclosure of the present specification, the remaining issues and expected RF requirements for intra-band on-current V2X operation in a licensed band may be considered.

Intra-band NR V2X con-current operation is designed to operate con-current with NR uplink/downlink on the operating bands combinations listed in Table 5.

TABLE 5

| Intra-band V2X con-current operating band Combination | NR Band | Interface |
|---|---|---|
| V2X_n79-n79 | n79 | Uu |
|  | n79 | PC5 |

Table 5 shows examples of operating bands used for Intra-band V2X con-current operation performed by a UE.

1-1. RF Requirements for TDM Operation

TDM operation for intra-band con-current operation may be supported as 1st priority in a licensed band such as operating band n79. And the baseline RF architecture according to V2X operating scenarios may be determined in licensed band.

To support TDM operation, the intra device coexistence evaluation in adjacent carrier needs to be considered. Conventionally, only the UE-to-UE (inter-device) coexistence for SL operation with adjacent carrier was considered. But, the TDM operation between NR SL and NR Uu does not have any impact to each other in RAT operation. So the intra device coexistence evaluation is not necessary to allow the TDM operation.

Whether or not to specify the additional RF requirements for SL operation and Uu operation as TDM manner in same/adjacent carrier or non-adjacent carrier needs to be considered.

Two ON/OFF time masks in RF perspective may be considered. One may be ON/OFF time mask for TDM operation in same carrier. And the other one may be ON/OFF time mask for TDM operation in different carrier.

Conventionally, TDM operation within different carrier operation in ITS spectrum was allowed.

So, the switching period and position should be considered with different carrier. However, if it is considered to allow TDM operation in same carrier in a licensed band, the switching period may not be considered.

So, the ON/OFF time mask for TDM operation in same carrier may be defined as following examples.

The following drawings are prepared to explain a specific example of the present specification. Since the names of specific devices or names of specific signals/messages/fields described in the drawings are provided by way of example, technical features of the present specification are not limited to specific names used in the following drawings.

Figure 7:
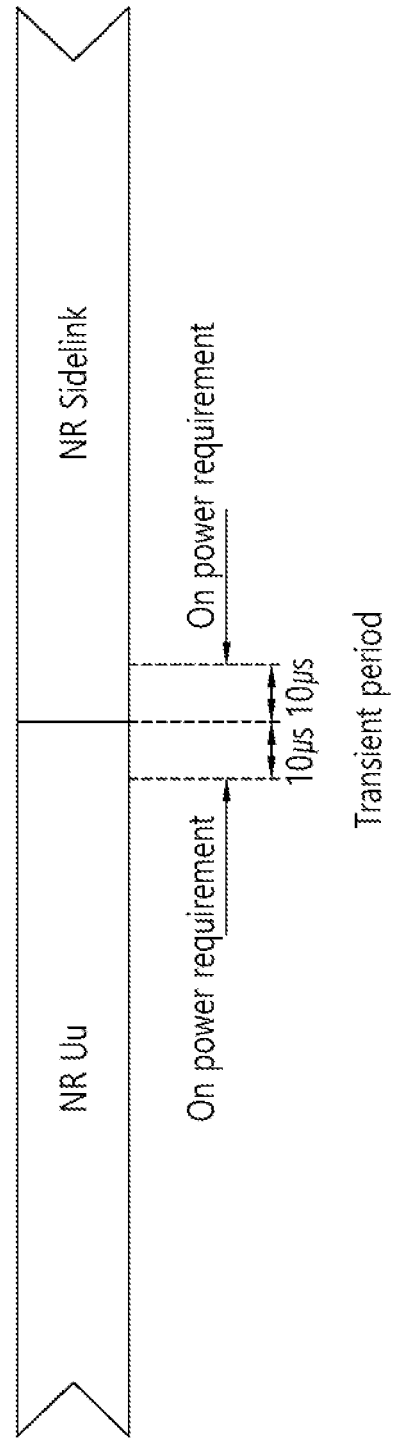
FIG. 7 illustrates a first example of ON/OFF time mask for TDM operation.

FIG. 7 illustrates a first example of ON/OFF time mask for TDM operation.

FIG. 7 illustrates an example of ON/OFF Time mask for TDM operation in same carrier from NR Uu to NR SL in licensed band. Time period to which ON power requirement is applied may be defined as ON time mask and other time period, for example transient period, may be defined as OFF time mask.

15 kHz SCS, 30 kHz SCS, 60 kHz SCS may be applied to the example of FIG. 7.

The following drawings are prepared to explain a specific example of the present specification. Since the names of specific devices or names of specific signals/messages/fields described in the drawings are provided by way of example, technical features of the present specification are not limited to specific names used in the following drawings.

Figure 8:
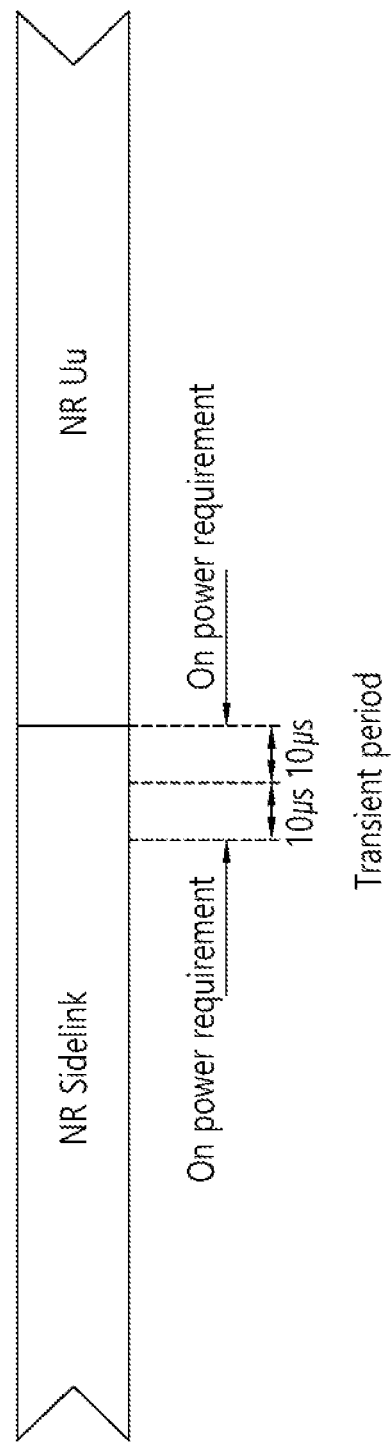
FIG. 8 illustrates a second example of ON/OFF time mask for TDM operation.

FIG. 8 illustrates a second example of ON/OFF time mask for TDM operation.

FIG. 8 illustrates an example of ON/OFF Time mask for TDM operation in same carrier from NR SL to NR Uu in licensed band.

15 kHz SCS, 30 kHz SCS may be applied to the example of FIG. 8.

The following drawings are prepared to explain a specific example of the present specification. Since the names of specific devices or names of specific signals/messages/fields described in the drawings are provided by way of example, technical features of the present specification are not limited to specific names used in the following drawings.

Figure 9:
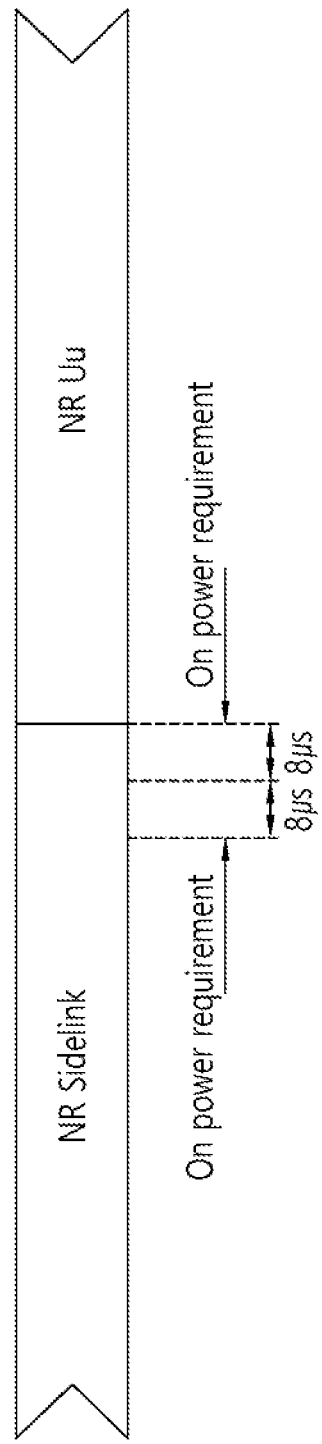
FIG. 9 illustrates a third example of ON/OFF time mask for TDM operation.

FIG. 9 illustrates a third example of ON/OFF time mask for TDM operation.

FIG. 9 illustrates an example of ON/OFF Time mask for TDM operation in same carrier from NR SL to NR Uu in licensed band.

60 kHz SCS may be applied to the example of FIG. 9.

Last 1 symbol in NR SL subframe before the boundary between NR SL subframe and NR Uu subframe may be punctured.

For 60 kHz SCS, 10 us+10 us transient period can be longer than time period of the 1 punctured symbol, then 1 slot will be exhausted in the V2X resource scheduling perspective. Therefore, the transient period may be adjusted with 8 us+8 us may be adjusted to keep the 1 symbol punctured time period for 60 kHz SCS.

For the other ON/OFF time mask for TDM operation in different carrier, the decision of TDM operation between LTE V2X and NR V2X in ITS spectrum may be applied.

To decide the ON/OFF time mask in different carrier, one different point is that the high priority is belong to NR Uu operation except V2X safety message in NR SL in licensed band. That is, except for a case in which V2X safety message is transmitted or received in NR SL in licensed band, NR Uu operation has higher priority than NR SL operation.

The priority in ITS spectrum may be decided as RF implementation when the LTE V2X and NR V2X has same priority. So it is quite difficult to define ON/OFF time mask in RF perspectives.

Hence, the present specification may proposes the following examples of proposals:

First example of Proposal: Transient period Time Mask for TDM operation in same carrier may be specified as shown in FIG. 7 to FIG. 9. Herein, ON/OFF time mask TDM operation in same carrier may mean transient period time mask.

Second example of Proposal: For the ON/OFF time mask for TDM operation in different carrier, requirements related to TDM operation in ITS spectrum with different carrier may be applied.

1-2. RF Requirements for FDM Operation

1) Transmitter Time Difference Between PC5 and Uu

Conventionally, it was discussed that the SL operation is in sync with the non-V2X operation in the same licensed bands such as n79 or n38. However, it was already agreed the $N_{TA\ offset}$ and $N_{TA,SL}$ for SL transmission in licensed band is 0 us as the following Table 6.

TABLE 6

NR Cell as synchronization reference source
The requirements in this subclause are applicable when the reference timing used for sidelink transmissions is a NR serving cell on a non-V2X sidelink carrier.
The sidelink transmissions takes place $(N_{TA\ offset} * N_{TA,SL}) * T_c$ before the reception of the first detected path (in time) of the corresponding downlink frame from the reference cell, where $N_{TA\ offset} = 0$ and $N_{TA,SL} = 0$.

Firstly, separate RF chain for FDM operation may be considered.

Figure 10:
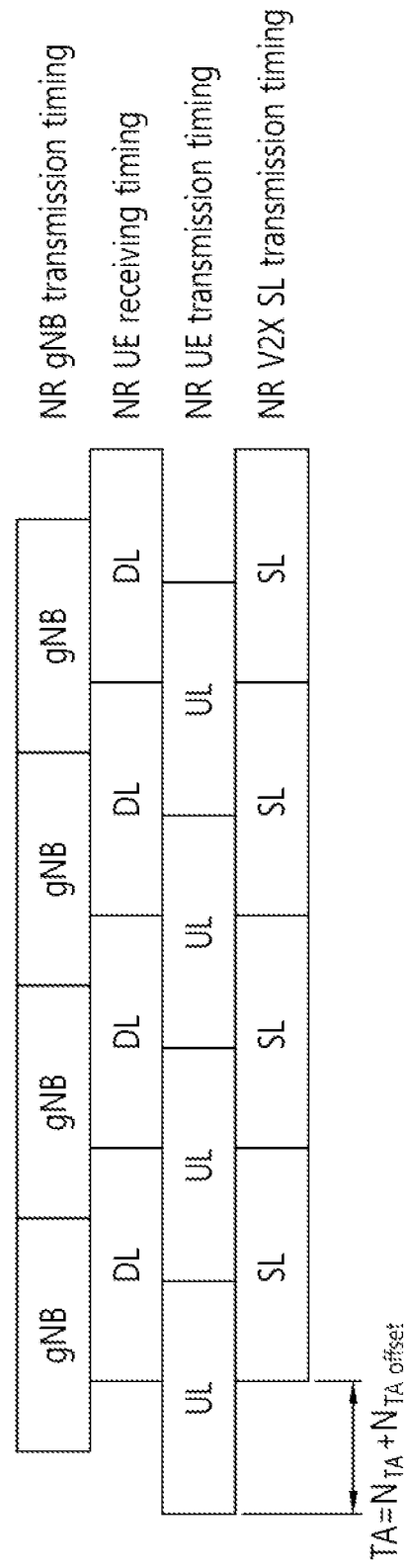
FIG. 10 illustrates an example of Tx/Rx timing descriptions for con-current operation.

The real transmission timing between NR UL/DL and SL has some offset as shown in an example of FIG. 10.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 10 illustrates an example of Tx/Rx timing descriptions for con-current operation.

As shown in the example of FIG. 10, Timing Advance (TA) is applied to NR UE transmission timing. NR V2X SL transmission timing may be synchronized with the NR UE receiving timing. Thus, there is a difference (for example, offset) between NR UL operation (for example, NR UE transmission timing) and NR V2X SL operation.

The following drawings are prepared to explain a specific example of the present specification. Since the names of specific devices or names of specific signals/messages/fields described in the drawings are provided by way of example, technical features of the present specification are not limited to specific names used in the following drawings.

Figure 11:
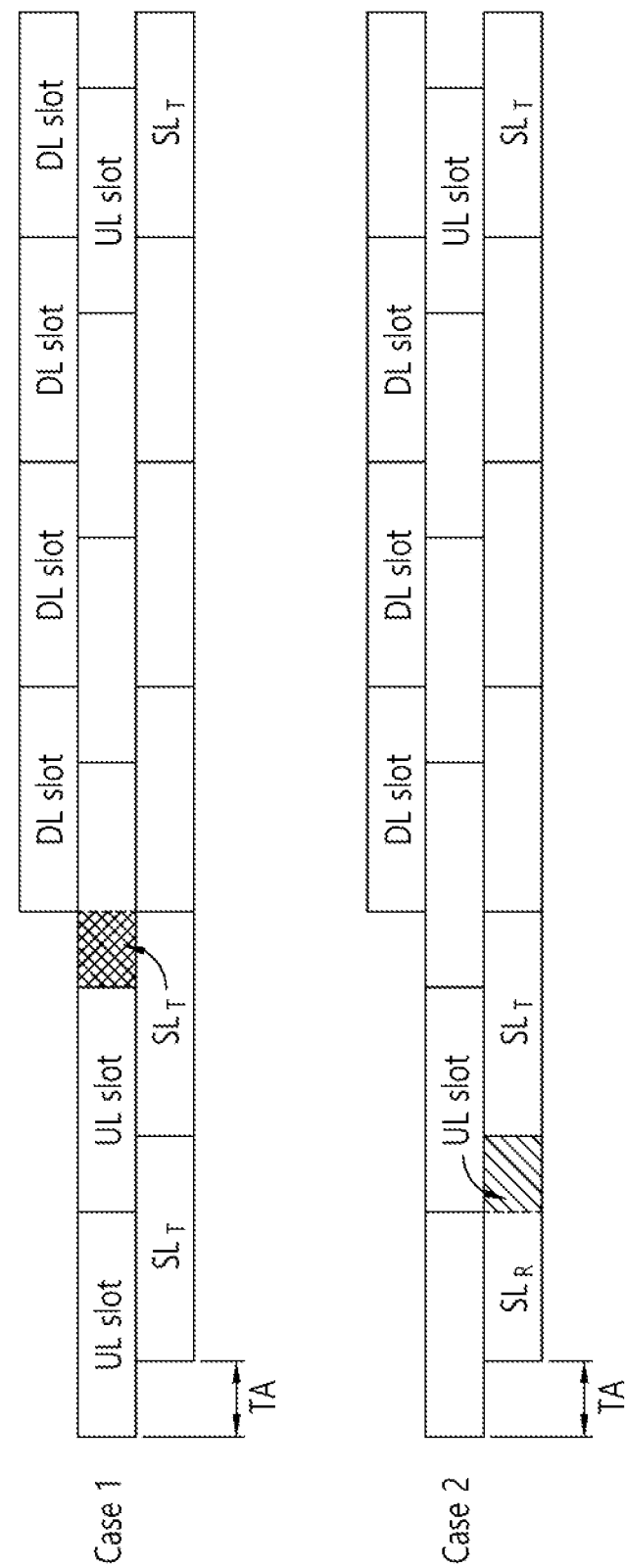
FIG. 11 illustrates an example of analysis of the transmission time difference for con-current operation.

FIG. 11 illustrates an example of analysis of the transmission time difference for con-current operation.

In FIG. 11, the self-interference problem between PC5 and Uu operation is analyzed. When the separate RF architecture is considered, the SL transmitted signal power can leak into the own NR received signal (black region) as Case1. Herein, separate RF architecture may mean that RF architecture for NR SL and RF architecture for NR Uu are separately implemented in the UE.

But, NR DL slot have some time gap from UL slot as in Case1 in FIG. 11. So it is expected that there is no interference problem in Case1.

In Case2, the $1^{st}$ slot of TDD DL/UL configuration is assigned as UL slot but there was no transmitted signal in Uu operation, so the $1^{st}$ SL slot was used to receive SL signal. Then UL signal on the second slot will leak into the SL reception (blue region) due to the TA difference as shown in Case 2. However, the last symbol (71.4 us for SCS 15 kHz, 35.7 us for SCS 30 kHz, 17.9 us for SCS 60 kHz) in SL slot may be punctured.

Also the TA (Timing advance) can be estimated based on the equation of $TA=N_{TA}+N_{TA\ offset}$. In other word, the general TA is decided by propagation delay of $N_{TA}$ and $N_{TA\ offset}$ which were specified in section 7.1.2 in 3GPP TS38.133 V16.7.0 as the following Table 7.

TABLE 7

| Frequency range and band of cell used for uplink transmission | $N_{TA\ offset}$ (Unit: $T_C$) |
|---|---|
| FR1 FDD or TDD band with neither E-UTRA-NR nor NB-IoT-NR coexistence case | 25600 = 13 us |
| FR1 FDD band with E-UTRA-NR and/or NB-IoT-NR coexistence case | 0 |
| FR1 TDD band with E-UTRA-NR and/or NB-IoT-NR coexistence case | 39936 = 20 us |
| FR2 | 13792 |

The maximum $N_{TA\ offset}$ is 20 us in FR1 with 39936*Tc, the expected $N_{TA}$ is 1-2 us when the Inter-Site Distance (ISD) 500 m cell is considered for E-UTRA and/or NR system by the propagation delay. Then the TA is estimated about 22 us. $T_c$ may mean time unit and the value of $T_c$ may be 0.509 ns. ISD may mean distance between cells. ISD may be defined to be equal to 3*R, R may mean cell radius.

But, NR only system may be considered to be deployed in n79 licensed band. Then 13 us for $N_{TA\ offset}$ in Table 7 may be considered to decide Time Advance (TA)=13 us+1-2 us=15 us in ISD 500 m cell in band n79.

Therefore, it may be expected that in Case2 UL transmission does not make any interference to the own SL reception considering the above expected TA (15 us) time for intra-band non-contiguous CA in n79 for all SCS waveforms.

Observation 1: 13 us $N_{TA\ offset}$ may be considered for NR only 500 m ISD cell. The all SCS waveform do not have any interference problem in its own device.

Also, the transient period with 10 us is not considered since there are separate RF architecture per each NR Uu and NR SL in licensed band for FDM operation.

Thus, SL and UL/DL operation may not make any interference with each other with current Radio Resource Management (RRM) agreement.

The pros and cons for timing alignment between NR Uu and NR SL according to align the DL slot timing or UL slot timing is summarized as shown in Table 8.

TABLE 8

| | DL slot timing (current RAN1/ RRM agreement) | UL slot timing (change the SL slot timing with UL slot of NR Uu) |
|---|---|---|
| Pros | No interference for all 15/30/60 kHz with 13 us $N_{TA\ offset}$ All UE can align the DL slot time | No interference for all 15/30/60 kHz regardless $N_{TA\ offset}$ |
| Cons | Can be interfered into SL reception for 60 kHz with 20 us $N_{TA\ offset}$ | Problem for IDLE NR UE due to lack of timing advance information Backward compatibility is not guaranteed. Conventional NR SL UE have inference problem due to different time alignment |

Table 8 shows example of comparison of timing alignment between NR SL and NR Uu.

Based on above Table 8, the following is proposed:

Third example of proposal: For the SL transmission time alignment, the current RRM agreements as specified in section 12.2.3 in 3GPP TS38.133 V16.7.0 may be kept.

Figure 12:
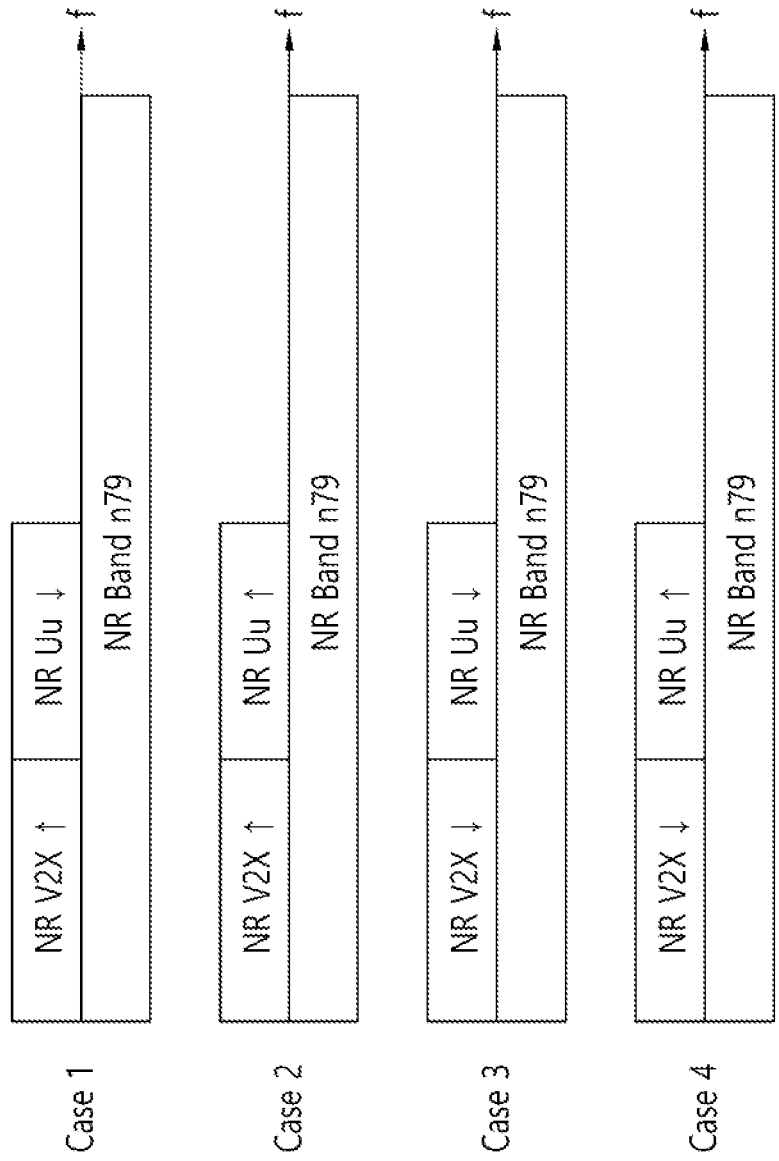
FIG. 12 illustrates an example of PC5-Uu simultaneous operation scenarios.

2) In Device Coexistence Evaluation for FDM Operation with Adjacent Carrier in a Licensed Band For the FDM operation between Uu UL/DL operation and PC5 SL operation in adjacent carrier, the important point for simulation assumptions is to decide the PC5-Uu simultaneous operation scenarios as shown in FIG. 12.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 12 illustrates an example of PC5-Uu simultaneous operation scenarios.

As shown in FIG. 12, when NR PC5 operation and NR Uu operation are performed simultaneously based on FDM operation, case 1 to case 4 in FIG. 12 may be considered.

There are 4 cases for PC5-Uu simultaneous operation in intra-device. The case 1 in FIG. 12 is already analyzed that the PC5 SL transmission timing is aligned the Uu DL reception slot in FIG. 11. So scenario, in which the UE transmits SL signal simultaneously during the UE receives DL signal based on NR Uu, is not possible.

For the Case 2 and Case 3, these are same scenarios as a conventional scenario which is based on con-current operation between PC5 SL Tx and Uu UL Tx in a licensed band. Furthermore, conventionally, the UE-to-UE coexistence results considering these two cases were already evaluated.

For the final Case 4, this scenario also can be considered as simultaneous Uu UL transmission and PC5 SL receptions as shown in FIG. 11 based on the shaded area of case 2 in FIG. 11. But this problem can be solved without any coexistence analysis since the last symbol of SL subframe is determined to be punctured as mentioned above.

So, the coexistence scenarios of Case2 and Case3 in FIG. 12 need to be solved. But these operation is quite similar to intra-band contiguous Carrier Aggregation (CA) operation or Dual Connectivity (DC) operation in a licensed band. So these operations were already allowed in licensed band. Hence it is preferred not to study the in-device coexistence analysis.

The following drawings are prepared to explain a specific example of the present specification. Since the names of specific devices or names of specific signals/messages/fields described in the drawings are provided by way of example, technical features of the present specification are not limited to specific names used in the following drawings.

Figure 13:
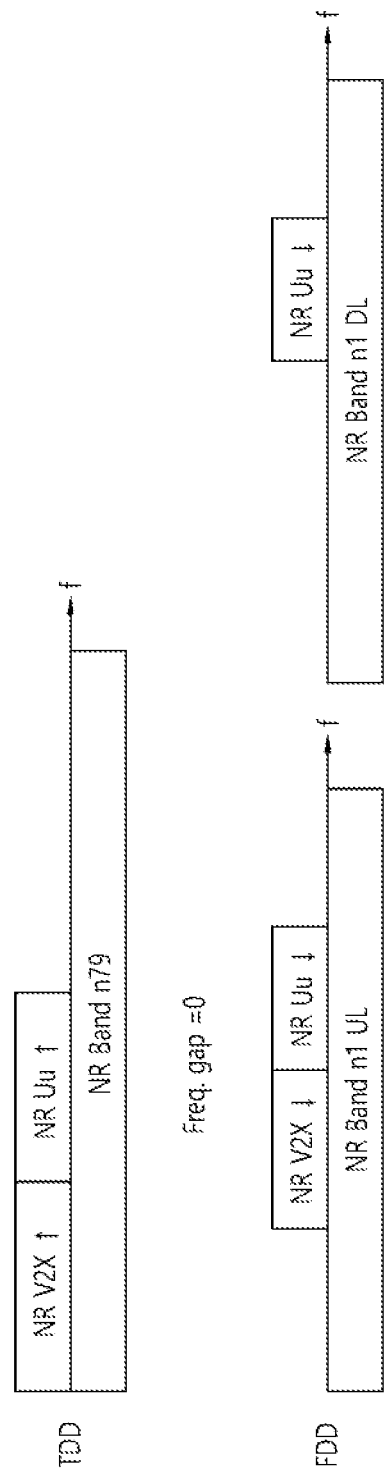
FIG. 13 illustrates an example of intra-band con-current operation within adjacent carrier.

FIG. 13 illustrates an example of intra-band con-current operation within adjacent carrier.

But, for the FDD intra-band con-current operation in n1 as shown in FIG. 13, further study of the detail coexistence scenarios is needed. Since the NR V2X reception is operated in UL frequency in FDD band with simultaneous NR Uu transmission, NR Uu transmission may affect NR V2X reception in FDD band, such as NR band n1.

The followings are proposed.

Fourth example of proposal: Without in-device coexistence study, the intra-band con-current SL operation with adjacent carrier for FDM operation in TDD band needs to be allowed.

Fifth example of proposal: Whether to allow the intra-band con-current SL operation with adjacent carrier for FDM operation in FDD specific band based on operator request due to self-interference problem needs to be studied.

3) In Device Coexistence Evaluation for FDM Operation with Non-Adjacent Carrier in a Licensed Band The FDM operation with non-adjacent carrier operation in a licensed bands was decided to treat as 3rd priority.

Figure 14:
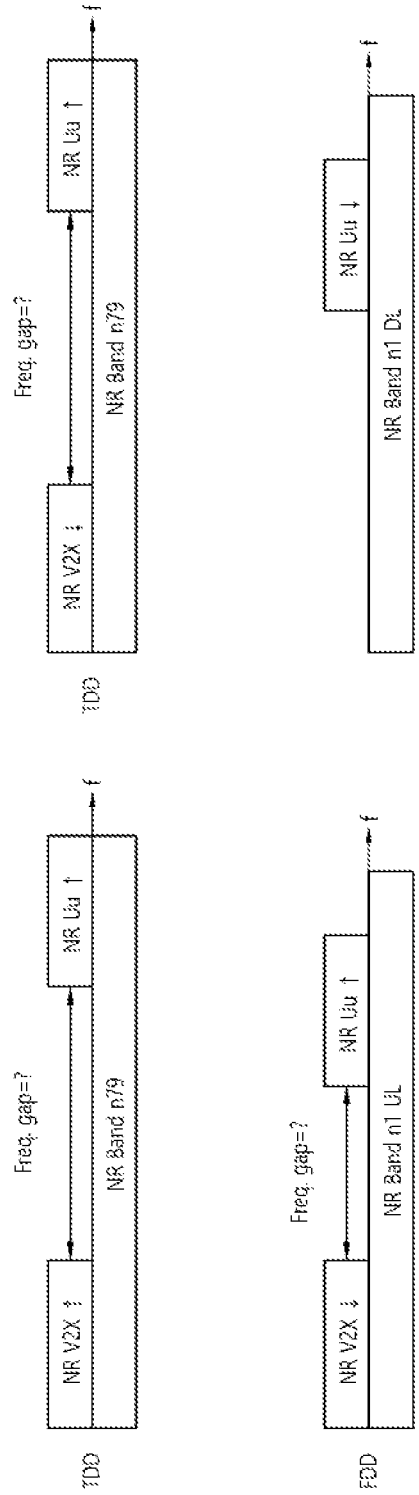
FIG. 14 illustrates an example of intra-band con-current operation within non-adjacent carrier.

For the FDM operation between Uu UL/DL and PC5 SL operation in non-adjacent carrier, the important point for simulation assumptions is to decide the PC5-Uu simultaneous operation scenarios as shown in FIG. 14.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 14 illustrates an example of intra-band con-current operation within non-adjacent carrier.

FIG. 14 shows example of use cases for intra-band con-current operation within non-adjacent carrier.

In TDD band, when the intra-band non-contiguous con-current operation between NR V2X and NR Uu is allowed, one of benefit is to allow simultaneous Transmission and reception for NR V2X and NR Uu operation in UL slot with frequency gap to protect each other.

So, this is same issue in FDD band as shown in FIG. 14.

Therefore, it needs to study how much frequency gap is needed to protect each system for FDM operation in both FDD/TDD band as following sixth example of proposal.

Sixth example of proposal: For the FDD/TDD intra-band con-current operation with non-adjacent carrier, the detail coexistence scenarios based on operator deployment scenarios and request need to be discussed.

1-3. Specification Aspect for Partial Used PC5 SL and Uu Operation in a Licensed Band To support simultaneous NR uplink and SL transmission in a licensed band, it needs to specify the con-current NR V2X operating bands in technical specification related to standards.

For TDM operation, operating band for V2X_n79A-n79A and ON/OFF time mask in same carrier firstly may be defined. And the ON/OFF time mask in different carrier will be decided based on conventional TDM operation between LTE V2X and NR V2X in ITS spectrum.

For the FDM operation, the follow RF core requirements may be defined based on separate RF architecture. Table 9 shows examples of NR V2X UE Tx/Rx requirements.

TABLE 9

| Section/Clause | Description |
|---|---|
| 5.3E | V2X operating band<br>Define the con-current operating bands for V2X_n79-n79 |
| 6.2E.1 | UE maximum output power for intra-band con-current V2X UE<br>Define V2X_n79-n79 with PC3 |
| 6.2E.2 | UE maximum output power for intra-band con-current V2X UE<br>Define MPR for intra-band contiguous/non-contiguous V2X_n79-n79 with PC3 |
| 6.2E.3 | UE maximum output power with additional requirements, Define A-MPR for intra-band contiguous/non-contiguous V2X_n79-n79 if the regional regulatory requirements for PC3 are identified |
| 6.2E.4 | Configured transmitted Power for intra-band con-current V2X UE<br>Define additional requirements for configured Tx power to support intra-band contiguous or non-contiguous con-current operation |
| 6.3E.1 | Minimum output power for intra-band con-current V2X UE<br>Define min. output power requirements to support intra-band contiguous or non-contiguous con-current operation |
| 6.3E.2 | Transmit OFF power for intra-band con-current V2X UE<br>Define Transmit OFF power requirements to support intra-band contiguous or non-contiguous con-current operation |
| 6.3E.3 | Transmit ON/OFF time mask for intra-band con-current V2X UE<br>Define Transmit ON/OFF time mask to support intra-band contiguous or non-contiguous con-current operation |
| 6.3E.4 | Power control for intra-band con-current V2X UE<br>Define power control requirements to support intra-band contiguous or non-contiguous con-current operation |
| 6.4E.1 | Frequency error for intra-band con-current V2X UE<br>Define Frequency error requirements to support intra-band contiguous or non-contiguous con-current operation |
| 6.4E.2 | Transmit modulation quality for intra-band con-current V2X UE<br>Define EVM, carrier leakage, IBE, spectrum flatness to support intra-band contiguous or non-contiguous con-current operation |
| 6.5E.1 | Occupied bandwidth for intra-band con-current V2X UE<br>Define Occupied bandwidth requirements to support intra-band contiguous or non-contiguous con-current operation |
| 6.5E.2 | Out of band emission for intra-band con-current V2X UE<br>Define ACER, SEM, A-SEM for ITS spectrum to support intra-band contiguous or non-contiguous con-current operation |
| 6.5E.3 | Spurious emissions for intra-band con-current V2X UE<br>Define UE-to-UE coexistence requirements for intra-band contiguous or non-contiguous con-current operation |
| 6.5E.4 | Transmit intermodulation for intra-band con-current V2X UE<br>Define Transmit intermodulation requirements for intra-band contiguous or non-contiguous con-current operation |
| 7.3E.3 | REFSENS requirements for intra-band con-current V2X UE<br>Define REFSENS requirements for intra-band contiguous or non-contiguous con-current operation |
| 7.4E.2 | Max. Input level for intra-band con-current V2X UE<br>Define max. input levels requirements for intra-band contiguous or non-contiguous con-current operation |
| 7.5E.2 | ACS for intra-band con-current V2X UE<br>Define ACS requirements for intra-band contiguous or non-contiguous con-current operation |
| 7.6E.2 and 7.6E.3 | Blocking characteristics for intra-band con-current V2X UE<br>Define in-band blocking/out-of-band blocking requirements for intra-band contiguous or non-contiguous con-current operation |

TABLE 9-continued

| Section/Clause | Description |
|---|---|
| 7.7E.2 | Spurious response for intra-band con-current V2X UE Define spurious response requirements for intra-band contiguous or non-contiguous con-current operation |
| 7.8E.3 | Wideband intermodulation for intra-band con-current V2X UE Define wideband intermodulation requirements for intra-band contiguous or non-contiguous con-current operation |

Table 9 shows examples of sections to define technical features.

Based on the above RF architecture and specification works, the intra-band con-current operation in a licensed band will be supported as the simultaneous transmission.

Based on above analysis, we propose as follow.

Seventh example of Proposal: Based on Table 9, the detailed RF requirements for intra-band con-current V2X operation in TDD band may be defined.

1) Full Duplexer and Half Duplexer for SL Enhancement

Which duplexer mode will be considered for partial usage operation between NR Uu and NR SL in a licensed band may be discussed.

Figure 15:
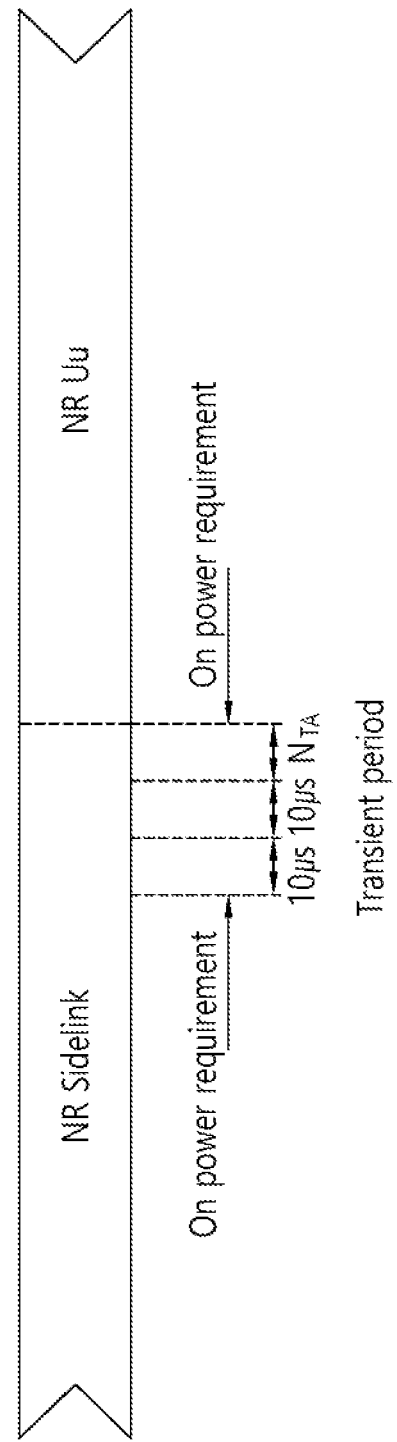
FIG. 15 illustrates a fourth example of ON/OFF time mask for TDM operation.
Figure 16:
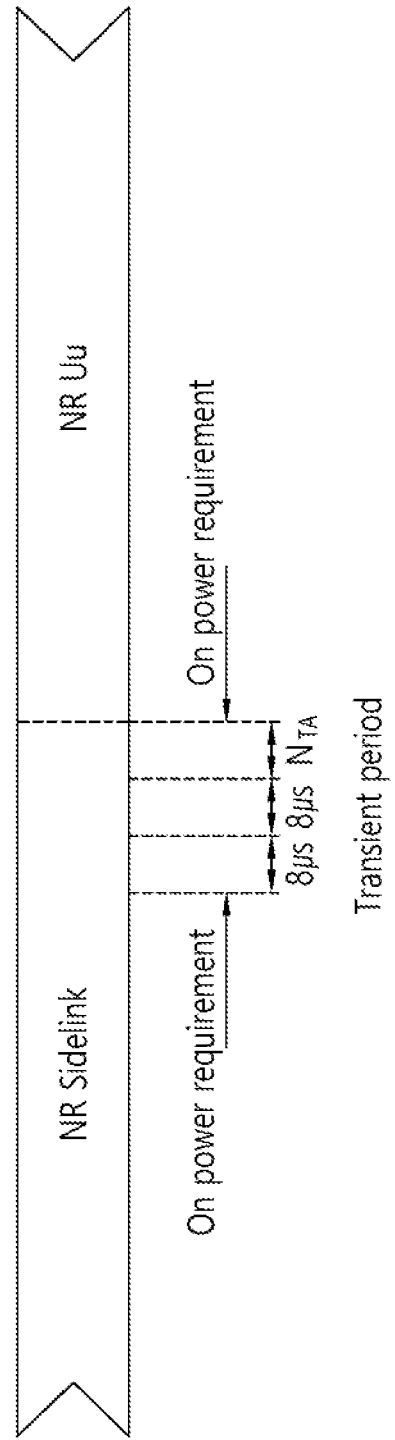
FIG. 16 illustrates a fifth example of ON/OFF time mask for TDM operation.

Basically, NR SL UE only allow half-duplexer mode only in ITS spectrum and licensed band in previous SL operation and NR SL enhancement as shown in FIGS. 14 to 16.

TDM operation: only allows Half Duplex (HD) mode for SL operation as same as NR V2X UE FDM operation with adjacent carrier: only allow HD mode for SL operation. The NR SL UE only allow transmission or reception in UL slot in TDD band or UL frequency band in FDD band.

FDM operation with non-adjacent carrier: still only HD mode for SL operation is allowed even though simultaneous transmission/reception for NR Uu and NR SL operation in different carrier is allowed.

Observation 2: The partial usage V2X operation scenarios in a licensed band are considered based on the half duplexer mode in SL operation perspective.

Maybe, the company has concerned simultaneous transmission/reception between NR SL and NR Uu operation for UE perspective as shown in FIG. 14. This operation is specific operation which was not studied in conventional SL operation. This will be considered.

2) REFSENS Requirements for Intra-Band Con-Current V2X UE

Reference sensitivity power level (REFSENS) for intra-band con-current V2X UE needs to be defined.

For example, the UE should be configured to satisfy a reference sensitivity power level (REFSENS) which is the minimum average power for each antenna port of the UE when receiving the downlink signal. For example, the REFSENS may be set such that the downlink signal throughput of the UE is 95% or more of the maximum throughput of the reference measurement channel. When the impact occurs, there is a possibility that the downlink signal throughput is reduced to 95% or less of the maximum throughput.

Detailed RF parameters for REFSENS requirements in licensed bands are defined as the following examples.

The V2X UE REFSENS is defined by the following equation:

$$REFSENS_{V2X} = kTB + SNR_{V2X} + 10\log_{10}(L_{CRB}*SCS*12/RX\_BW) + (NF_{V2X} + IM) - \text{Diversity gain}$$

Where kTB: Thermal noise level is [−174 dBm(kT)+10*$\log_{10}$(RX BW)] dBm.

NF: Noise figure. 13 dB is used for LAA and can be reused for NR V2X requirements. Assumed NF is 9 dB<3 GHz, NF is 10 dB>=3 GHz (e.g B42, n77, n78, n79 . . . ) at licensed bands at FR1.

IM: 2.5 dB is assumed. When the number of RB size equal to or less than 24 RBs, 0.5 dB additional relaxation is allowed.

Target SNR: −0.5 dB

Diversity gain: 3 dB $L_{CRB}$ may mean transmission bandwidth which represents the length of a contiguous resource block allocation expressed in units of resources blocks. RX_BW may mean Bandwidth used for reception.

So, the above equation will be applied to decide the REFSENS requirements in licensed band such as n79 NR band. REFSENS requirements for NR Uu operation in n79 may be used for intra-band con-current V2X operation.

Also, the expected REFSENS requirements are proposed in n79 NR band for SL operation as shown in Table 10, Table 11 and Table 12.

TABLE 10

| Intra-band con-current V2X Band | | | | NR Operating band/SCS/Channel bandwidth/Duplex-mode | | | | | | | | |
|---|---|---|---|---|---|---|---|---|---|---|---|---|
| NR V2X Band (PC5) | NR Band (Uu) | NR Band | SCS kHz | 10 MHz (dBm) | 20 MHz (dBm) | 30 MHz (dBm) | 40 MHz (dBm) | 50 MHz (dBm) | 60 MHz (dBm) | 80 MHz (dBm) | 100 MHz (dBm) | Duplex Mode |
| n79 | n79 | n79 | 15 | N/A | N/A | N/A | −89.6 | −88.6 | N/A | N/A | N/A | TDD |
|  |  |  | 30 | N/A | N/A | N/A | −89.7 | −88.7 | −87.9 | −86.6 | −85.6 | (Uu) |
|  |  |  | 60 | N/A | N/A | N/A | −89.9 | −88.8 | −88.0 | −86.7 | −85.7 |  |
|  |  | n79 | 15 | −95.5 | −92.2 | −90.4 | −89.1 | N/A | N/A | N/A | N/A | HD |
|  |  |  | 30 | −95.1 | −92.4 | −90.7 | −89.2 | N/A | N/A | N/A | N/A | (PC5) |
|  |  |  | 60 | −95.9 | −92.1 | −90.9 | −89.4 | N/A | N/A | N/A | N/A |  |

Table 10 shows examples of Reference sensitivity for intra-band con-current V2X operating Band.

In Table 10, values of REFSENS are defined based on a combination of operating band, subcarrier spacing (SCS), channel bandwidth, and duplex mode.

For example, a UE may receive signal based on operating band n79, SL communication (NR V2X via PC5), channel bandwidth of 10 MHz, SCS of 15 kHz. Then, the UE may receive signal based on −95.5 dBm of reference sensitivity.

shall be >95% of the maximum throughput of the reference measurement channels as specified in Annexes A.7.2 in 3GPP TS38.101-1 V17.1.0. Also the NR downlink throughput shall be >95% of the maximum throughput of the reference measurement channels as specified in Annexes A.3 in 3GPP TS38.101-1 V17.1.0.

Reference sensitivity power level requirements are applied based on Table 9 to Table 11.

TABLE 11

| Intra-band con-current V2X Band | | | NR operating Band/SCS/Channel bandwidth/Nrb/Duplex mode | | | | | | | | | |
| --- | --- | --- | --- | --- | --- | --- | --- | --- | --- | --- | --- | --- |
| NR V2X Band (PC5) | NR band (Uu) | UL band (Uu) | SCS (kHz) | 10 MHz (dBm) | 20 MHz (dBm) | 30 MHz (dBm) | 40 MHz (dBm) | 50 MHz (dBm) | 60 MHz (dBm) | 80 MHz (dBm) | 100 MHz (dBm) | Duplex Mode |
| n79 | n79 | n79 | 15 | N/A | N/A | N/A | 216 | 270 | N/A | N/A | N/A | TDD |
|  |  |  | 30 | N/A | N/A | N/A | 100 | 128 | 162 | 216 | 270 | (Uu) |
|  |  |  | 60 | N/A | N/A | N/A | 50 | 64 | 75 | 100 | 135 |  |

Table 11 shows examples of UL configuration for REFSENS for intra-band con-current V2X operating Band (PC5).

Table 11 shows examples of number of resource blocks (e.g. $N_{RB}$) based on a combination of SCS, channel bandwidth. Examples of number of resource block in Table 11 are used for testing REFSENS of the UE based on Table 10. The number of resource blocks defined in Table 11 may be used for uplink resources to test the UE based on REFSENS of the UE in Table 10, such as by counting throughput of the transceiver of the UE.

2. Second Example of the Disclosure of the Present Specification

The priority rule can be used to decide the switching position for TDM operation between NR Uu and NR SL operation based on MAC protocol specification for V2X con-current operation in licensed band for both same carrier and different carrier as follow. Herein, lower value of priority or lower value of threshold means having higher priority:

TABLE 12

| Intra-band con-current V2X Band | | | NR operating Band/SCS/Channel bandwidth/Nrb/Duplex mode | | | | | | | | | |
| --- | --- | --- | --- | --- | --- | --- | --- | --- | --- | --- | --- | --- |
| NR V2X Band (PC5) | NR band (Uu) | V2X band (PC5) | SCS (kHz) | 10 MHz (dBm) | 20 MHz (dBm) | 30 MHz (dBm) | 40 MHz (dBm) | 50 MHz (dBm) | 60 MHz (dBm) | 80 MHz (dBm) | 100 MHz (dBm) | Duplex Mode |
| n79 | n79 | n79 | 15 | 50 | 105 | 160 | 216 | N/A | N/A | N/A | N/A | HD |
|  |  |  | 30 | 24 | 50 | 75 | 105 | N/A | N/A | N/A | N/A | (PC5) |
|  |  |  | 60 | 10 | 24 | 36 | 50 | N/A | N/A | N/A | N/A |  |

Table 12 shows examples of SL Tx configuration for REFSENS for intra-band con-current V2X operating Band (Uu).

Table 12 shows examples of number of resource blocks (e.g. $N_RB$) based on a combination of SCS, channel bandwidth. Examples of number of resource block in Table 12 are used for testing REFSENS of the UE based on Table 10. The number of resource blocks defined in Table 12 may be used for uplink resources to test the UE based on REFSENS of the UE in Table 10, such as by counting throughput of the transceiver of the UE.

Eighth example of proposal: Based on Table 10 to Table 12, the REFSENS requirements for intra-band con-current V2X operation in n79 are defined.

Rx requirements for NR intra-band V2X con-current operation with adjacent channel may include Reference sensitivity power level.

For example, for the intra-band V2X operation, the reference sensitivity power level is applied per RAT. The requirements in Table 10 is applicable for both NR downlink and NR sidelink. NR V2X sidelink throughput for the carrier

- if both sl-PrioritizationThres and ul-PrioritizationThres are configured, the assigned priority of each NR SL and NR Uu has higher than each threshold, then NR Uplink has high priority than NR SL transmission.
- if both sl-PrioritizationThres and ul-PrioritizationThres are configured, the assigned priority of each NR SL and NR Uu has lower than each threshold, then NR Uplink has high priority than NR SL transmission.
- if both sl-PrioritizationThres and ul-PrioritizationThres are configured, the assigned priority of NR SL is higher than sl-PrioritizationThres and the assigned priority of NR Uu has lower than ul-PrioritizationThres, then NR uplink has high priority than NR SL transmission.
- if both sl-PrioritizationThres and ul-PrioritizationThres are configured, the assigned priority of NR SL is lower than sl-PrioritizationThres and NR Uu has higher than ul-PrioritizationThres, then NR SL transmission has high priority than NR uplink.

sl-PrioritizationThres may mean threshold value for prioritization of NR SL communication. ul-PrioritizationThres may mean threshold value for prioritization of NR Uu communication.

As explained in the first Example of the disclosure of the present specification, FIG. 7 to FIG. 9 are applied for a case in which a UE performs TDM operation for NR SL communication and NR Uu communication in same carrier. Also, FIG. 7 to FIG. 9 are applied for a case in which NR SL slot and NR UL slot do not overlap.

If different TAs are applied to NR SL and NR UL, that is, when transitioning from SL (low priority) n slot to UL (high) n+1 slot, the transient period assigned to the SL may overlap as much as the NTA section depending on the application of TA ($N_{TA}+N_{TA\_offset}$) and the application of $_{TA\ offset}$ of SL. In this case, the transient period applied to the SL slot can be advanced by the NTA time as shown in FIG. 15 and FIG. 16.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 15 illustrates a fourth example of ON/OFF time mask for TDM operation.

FIG. 15 shows an example of ON/OFF Time mask for TDM operation in same carrier from NR SL to NR Uu in licensed band when UL and SL has different TA (15 kHz/30 kHz SCS).

The following drawings are prepared to explain a specific example of the present specification. Since the names of specific devices or names of specific signals/messages/fields described in the drawings are provided by way of example, technical features of the present specification are not limited to specific names used in the following drawings.

FIG. 16 illustrates a fifth example of ON/OFF time mask for TDM operation.

FIG. 16 shows an example of ON/OFF Time mask for TDM operation in same carrier from NR SL to NR Uu in licensed band when UL and SL has different TA (60 kHz SCS).

Therefore, even in the same carrier, the On/Off time mask may be determined according to the above two methods by the above priority rule.

Option 1: In all cases, the transient period is decided by considering the punctured symbol in SL as shown in FIG. 7 to FIG. 9 above.

Option 2: In case of performing TDM from UL (high) n+1 to the SL (low) n slot, since the transition period may overlap the first UL symbol of high priority. In this case, in order to eliminate the interference effect, the corresponding transition period is configured by advancing $N_{TA}$ based on SL slot, such that the transition period does not overlap the slot to be protected.

To decide the ON/OFF time mask in different carrier, one different point is that the high priority is belong to NR Uu operation except V2X safety message in NR SL in licensed band. That is, except for a case in which V2X safety message is transmitted or received in NR SL in licensed band, NR Uu operation has higher priority than NR SL operation.

In addition, in the following, when a UE using a shared RF structure performs TDM operation on different carriers for NR SL operation and NR Uu operation, the interference effect is analyzed by considering the following 4 cases (e.g. Case 1 to Case 4 in FIG. 17) based on the priority rule.

The following drawings are prepared to explain a specific example of the present specification. Since the names of specific devices or names of specific signals/messages/fields described in the drawings are provided by way of example, technical features of the present specification are not limited to specific names used in the following drawings.

Figure 17:
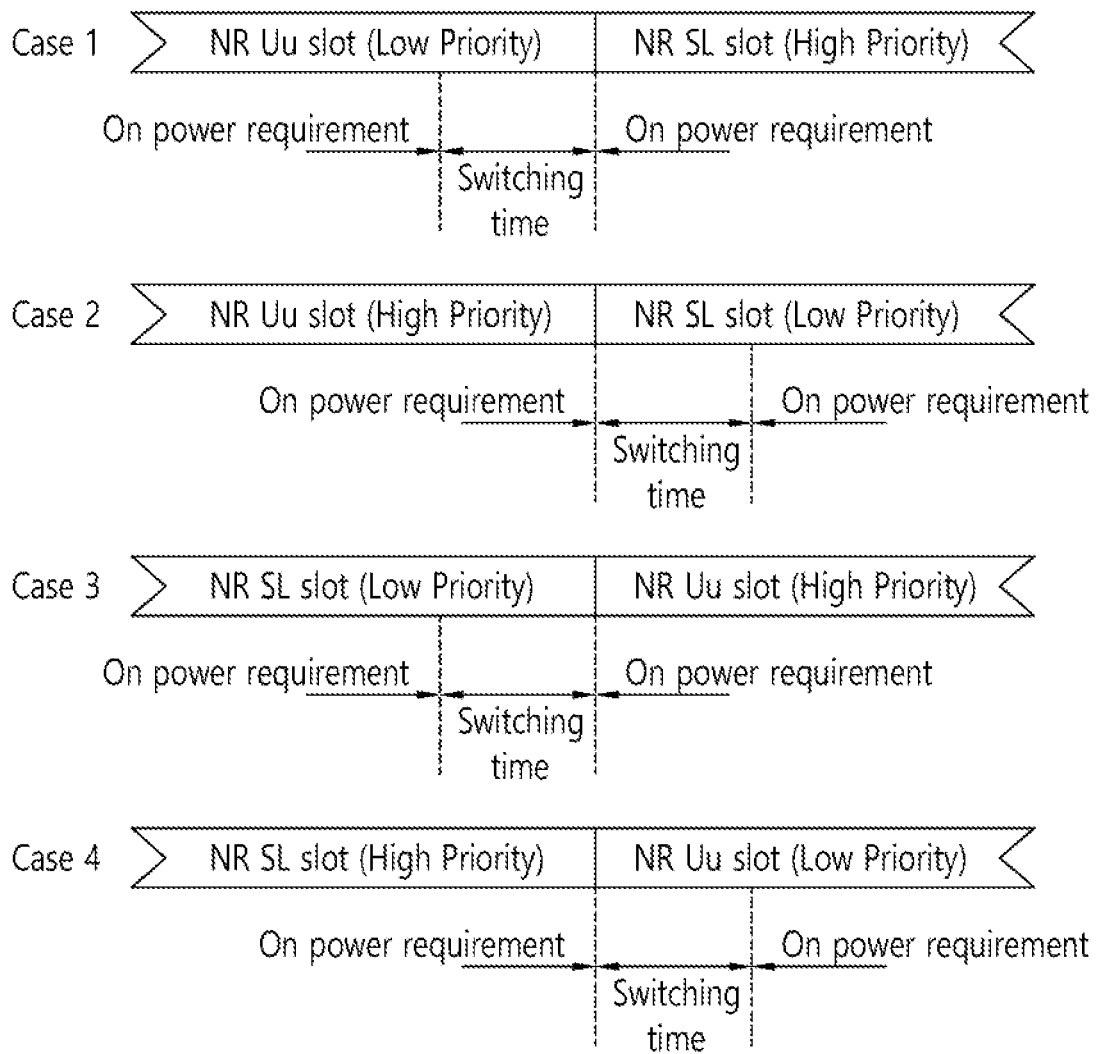
FIG. 17 illustrates an example of cases for TDM operations of according to an embodiment of the present disclosure.

FIG. 17 illustrates an example of cases for TDM operations of according to an embodiment of the present disclosure.

FIG. 17 illustrates 4 cases. In 4 cases, switching time is configured in a time domain belongs to slot has lower priority. ON power requirements are applied on time period except switching time in FIG. 17.

For example, Cases 1 shows an example that NR Uu has low priority and NR SL has high priority. Switching time is configured in slot boundary in Uu slot side.

FIG. 18 to FIG. 21 shows example of analysis for interference of each cases in FIG. 17 respectively.

The following drawings are prepared to explain a specific example of the present specification. Since the names of specific devices or names of specific signals/messages/fields described in the drawings are provided by way of example, technical features of the present specification are not limited to specific names used in the following drawings.

Figure 18:
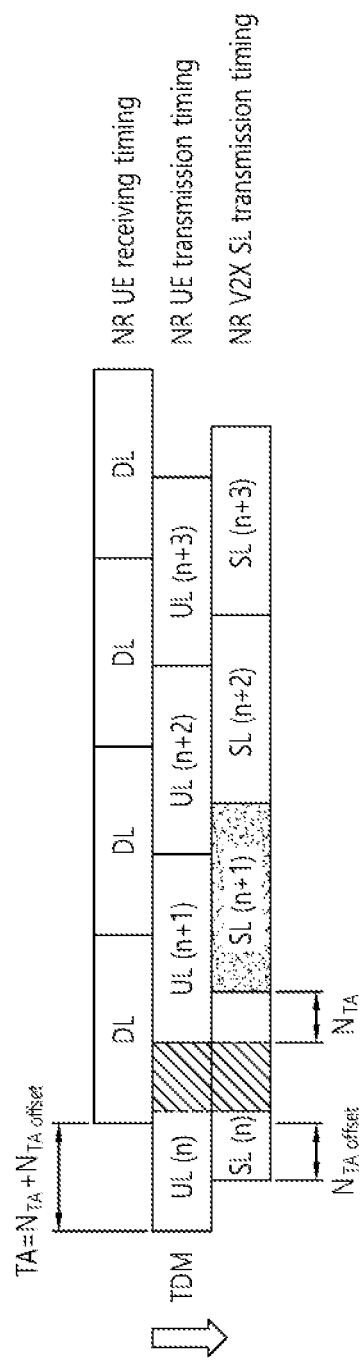
FIG. 18 illustrates an example of interference analysis for case 1 of FIG. 17.

FIG. 18 illustrates an example of interference analysis for case 1 of FIG. 17.

NR Uu has low priority in case 1.

Switching time of 150 us is applied to UL n slot (e.g. UL(n) of FIG. 18) because Uu has low priority. Herein, $N_{TA\ offset}$ is equal to 13 us, $N_{TA}$ is equal to 2 us for ISD 500 m. Thus, SL slot n+1 (e.g. SL(n+1) of FIG. 18) is protected because NR Uu slot with low priority has switching time.

As above, in Case 1, the same switching time (150 us) as indicated by shaded area above is applied to the NR UL (n) slot, which is an area corresponding to low priority. In this case, the signal of the SL (n+1) slot to be protected does not need a potential section (e.g. time section required for the switching time) for the switching time, and there is no influence of interference.

The following drawings are prepared to explain a specific example of the present specification. Since the names of specific devices or names of specific signals/messages/fields described in the drawings are provided by way of example, technical features of the present specification are not limited to specific names used in the following drawings.

Figure 19:
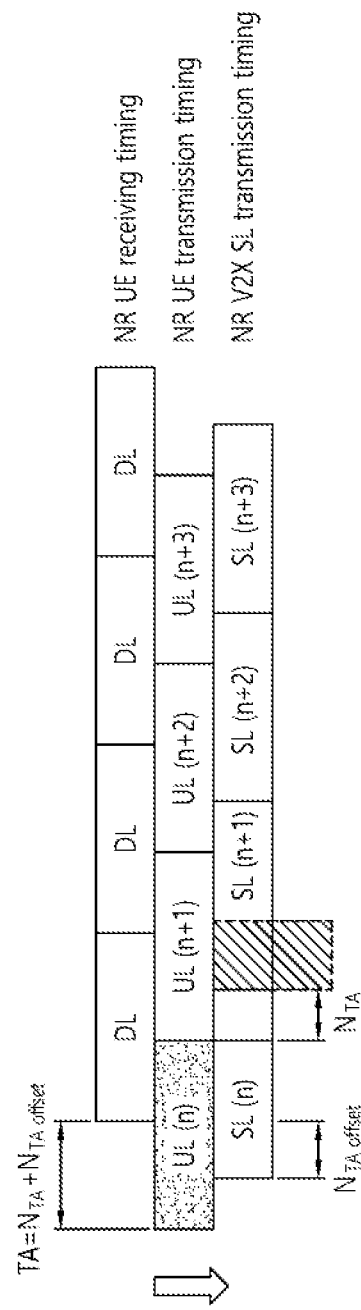
FIG. 19 illustrates an example of interference analysis for case 2 of FIG. 17.

FIG. 19 illustrates an example of interference analysis for case 2 of FIG. 17.

NR SL has low priority in case 2.

Switching time of 150 us is applied to SL n+1 slot (e.g. SL(n+1) of FIG. 19) because SL has low priority. Herein, $N_{TA\ offset}$ is equal to 13 us, $N_{TA}$ is equal to 2 us for ISD 500 m. Thus, UL slot n (e.g. UL(n) of FIG. 19) is protected because NR SL slot with low priority has switching time.

As above, in Case 2, the same switching time (150 us) as indicated by shaded area above is applied to the NR SL (n+1) slot, which is an area corresponding to low priority. In this case, the signal of the UL (n) slot to be protected does not need a potential section (e.g. time section required for the switching time) for the switching time, and there is no influence of interference.

The following drawings are prepared to explain a specific example of the present specification. Since the names of specific devices or names of specific signals/messages/fields described in the drawings are provided by way of example, technical features of the present specification are not limited to specific names used in the following drawings.

Figure 20:
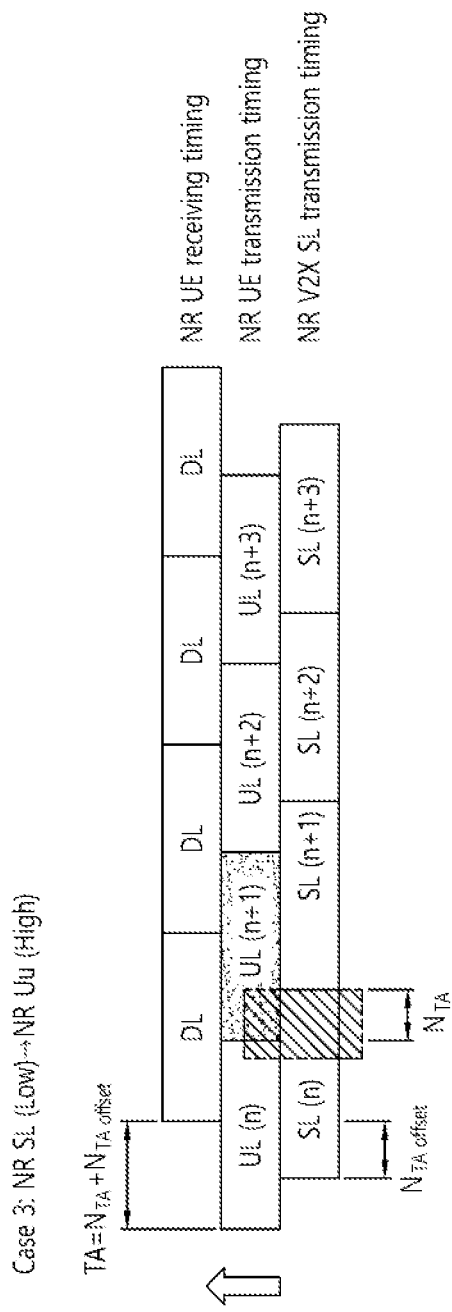
FIG. 20 illustrates an example of interference analysis for case 3 of FIG. 17.

FIG. 20 illustrates an example of interference analysis for case 3 of FIG. 17.

NR SL has low priority in case 3.

Switching time of 150 us is applied to SL n slot (e.g. SL(n) of FIG. 20) because SL has low priority. Herein, $N_{TA\ offset}$ is equal to 13 us, $N_{TA}$ is equal to 2 us for ISD 500 m. Thus, UL slot n+1 (e.g. UL(n+1) of FIG. 20) is protected because NR SL slot with low priority has switching time. However, UL data with high priority is broken as much as $N_{TA}$ of 2 us, which is the overlapping part. UL may be protected if shifting the switching time by 2 us based on SL slot boundary.

As above, in Case 3, the same switching time (150 us) as indicated by shaded area above is applied to the NR SL (n) slot, which is an area corresponding to low priority.

However, the signal of the UL (n+1) slot, which to be protected, overlaps the SL (n) slot by the $N_{TA}$ time, and data transmission based on UL may not be performed during the overlapping portion according to the application of this switching time. Therefore, in order to protect this, the switching time must be configured by advancing as much as $N_{TA}$ (e.g. shifting switching time earlier from the slot boundary as $N_{TA}$) based on the SL slot so that influence of interference does not exist.

Alternatively, the value for this overlapping part is about 2 us based on 500 m ISD, and the effect on this overlapping part may not expected to be large, so the switching time may be applied according to the slot boundary like the example shown in FIG. 20.

The following drawings are prepared to explain a specific example of the present specification. Since the names of specific devices or names of specific signals/messages/fields described in the drawings are provided by way of example, technical features of the present specification are not limited to specific names used in the following drawings.

Figure 21:
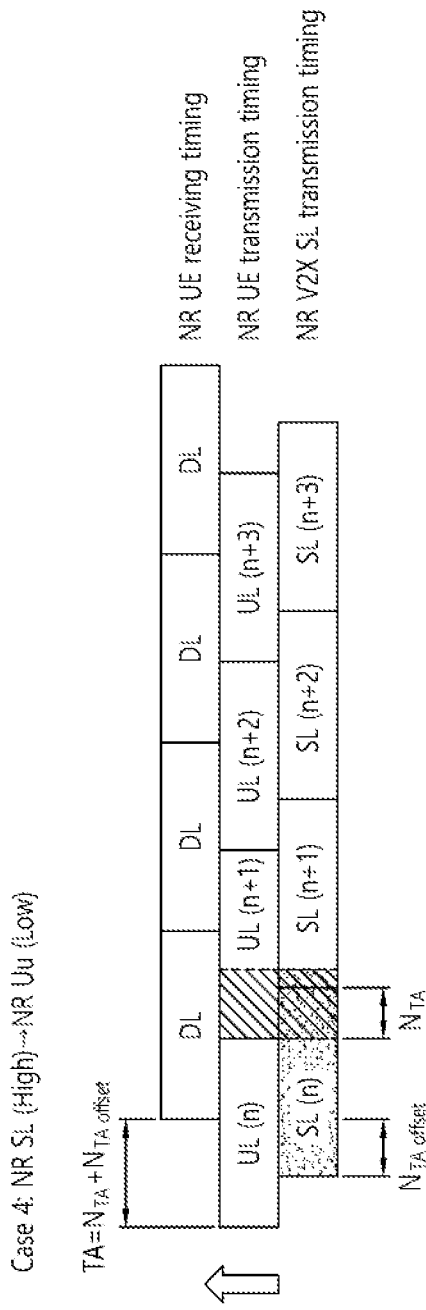
FIG. 21 illustrates an example of interference analysis for case 4 of FIG. 17.

FIG. 21 illustrates an example of interference analysis for case 4 of FIG. 17.

NR Uu has low priority in case 4.

Switching time of 150 us is applied to UL n+1 slot (e.g. UL(n+1) of FIG. 21) because Uu has low priority. Herein, $N_{TA\ offset}$ is equal to 13 us, $N_{TA}$ is equal to 2 us for ISD 500 m. However, SL data with high priority is broken as much as $N_{TA}$ of 2 us, which is the overlapping part. However, there is no problem because the last symbol of SL is punctured and UL with low priority has switching time.

As above, in Case 4, the same switching time (150 us) as indicated by shaded area above is applied to the NR UL (n+1) slot, which is an area corresponding to low priority. However, the signal of the SL (n+1) slot overlaps with NR UL (n+1) slot by time of $N_{TA}$, so the UE cannot transmit data of SL during the overlapping part due to switching time. However, this overlapping part is as long as $N_{TA}$, and since this overlapping part can be included in the time of puncturing area in the last symbol of SL, there may not be no influence of interference.

Therefore, Second Example of the disclosure of the present specification proposes the following two on/off time mask setting methods for different carriers.

Figure 22:
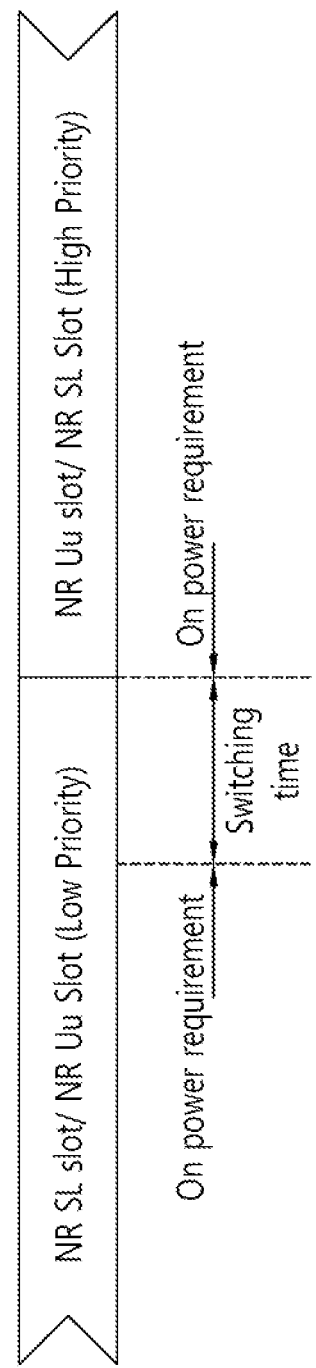
FIG. 22 illustrates a first example of ON/OFF time mask for TDM operation according to an embodiment of the present disclosure.
Figure 23:
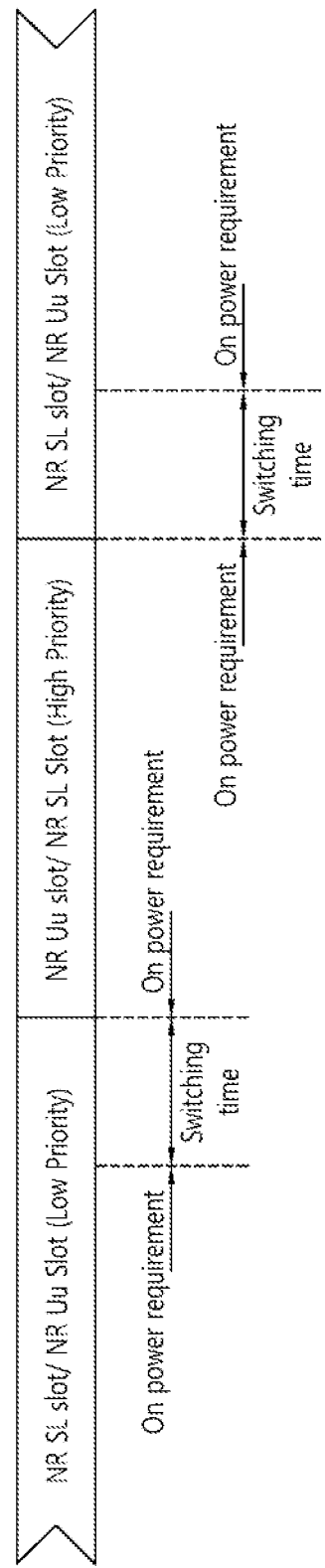
FIG. 23 illustrates a second example of ON/OFF time mask for TDM operation according to an embodiment of the present disclosure.

First example of option: Regardless of all cases, set the switching time to the RAT with low priority based on the slot boundary as shown in FIG. 22 and FIG. 23.

Second example of option: In case of performing TDM from NR SL slot to NR Uu slot as in Case 3 and Case 4 (e.g. Case 3 and Case 4 of FIG. 17, FIG. 20, FIG. 21), the slot boundaries may overlap each other as shown in the shaded area above. In this case, the switching time may be configured by advancing or delaying as much as $N_{TA}$ based on the SL slot, such that switching time does not overlap the slot to be protected.

The first example of option and the second example of option may be defined based on the following FIG. 22 and FIG. 23 below. FIG. 23 may explain a slightly more general On/Off time mask. For the TDM operation in different carrier, the following transmit ON/OFF time masks in FIG. 22 and FIG. 23 are applied.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 22 illustrates a first example of ON/OFF time mask for TDM operation according to an embodiment of the present disclosure.

FIG. 22 illustrates a first example of ON/OFF time mask for TDM operation in different carrier.

For example, FIG. 22 shows an example of ON/OFF Time mask for TDM operation in different carrier from NR SL to NR Uu or from NR Uu to NR SL in licensed band. As shown in FIG. 22, switching time is configured within slot with low priority.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 23 illustrates a second example of ON/OFF time mask for TDM operation according to an embodiment of the present disclosure.

FIG. 23 illustrates a second example of ON/OFF time mask for TDM operation in different carrier.

For example, FIG. 23 shows an example of ON/OFF Time mask for TDM operation in different carrier from NR SL to NR Uu or NR Uu to NR SL in licensed band. As shown in FIG. 23, switching time is configured within slot with low priority.

Based on descriptions and analysis based on Second Example of the disclosure of the present specification, Second Example of the disclosure of the present specification proposes as follow:

First example of Proposal: ON/OFF Time Mask for TDM operation in same carrier may be defined as shown in FIG. 7 to FIG. 9 as basic principle.

Second example of Proposal: When UL slot and SL slot are overlapped by different TA, the NTA time may be considered as shown in FIG. 15 and FIG. 16.

Third example of Proposal: For the ON/OFF time mask for TDM operation in different carrier, the ON/OFF Time mask may be defined based on either in FIG. 22 and FIG. 23.

Figure 24:
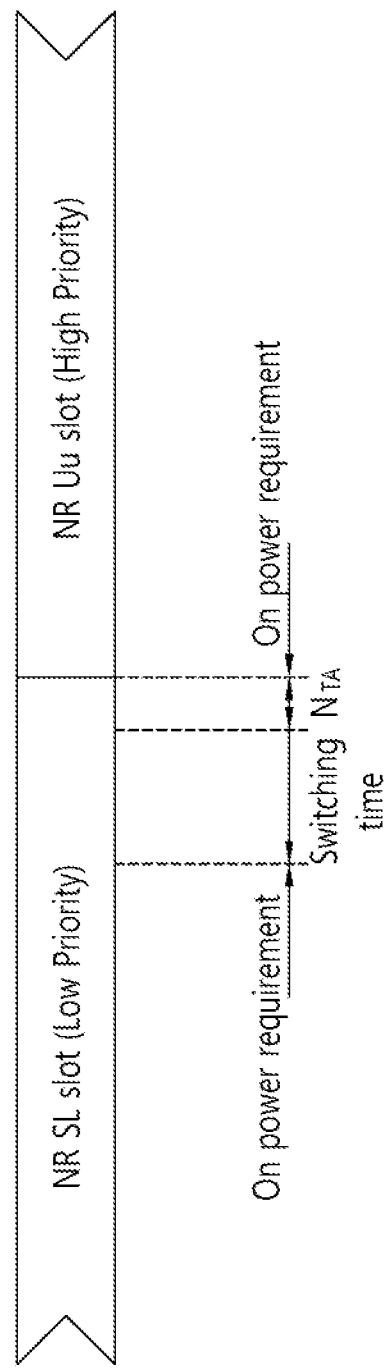
FIG. 24 illustrates an example of ON/OFF Time mask for TDM operation in different carrier from NR SL to NR Uu.

For example, the following FIG. 24 shows an example of ON/OFF time mask for case 3.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 24 illustrates an example of ON/OFF Time mask for TDM operation in different carrier from NR SL to NR Uu.

FIG. 24 shows an example of ON/OFF Time mask for TDM operation in different carrier from NR SL to NR Uu in licensed band when UL and SL has different TA.

For example, in FIG. 24, the switching time may be advanced about $N_{TA}$ time from SL slot boundary in case 3 (e.g. case 3 of FIG. 20) to eliminate the overlapped region between high priority UL (n+1) slot and switching time in SL (n) slot.

According to the Second Example of the disclosure of the present specification, regardless of TDM cases between NR SL and NR Uu in different carrier, the On/off time mask for TDM operation between NR SL and NR Uu with shared RF architecture, will be applied as shown in FIG. 22 and/or FIG. 23 are applied.

For example, the switching time may be advanced about time of $N_{TA}$ from SL slot boundary in case 3 to eliminate the overlapped region between high priority UL (n+1) slot and switching time in SL (n) slot in both same carrier and different carrier in FIG. 24.

$N_{TA}$ time may be determined by cell coverage in supported operating NR band.

For the TDM operation between NR SL and NR Uu in same carrier, the on/off time mask in FIG. 7 to FIG. 16 may be applied based on Sub-Carrier Spacing (SCS).

First Example of the disclosure of the present specification and/or second example of the disclosure of the present specification may be implemented based on a combination of both of the examples or implemented respectively.

The following drawings are prepared to explain a specific example of the present specification. Since the names of specific devices or names of specific signals/messages/fields described in the drawings are provided by way of example, technical features of the present specification are not limited to specific names used in the following drawings.

Figure 25:
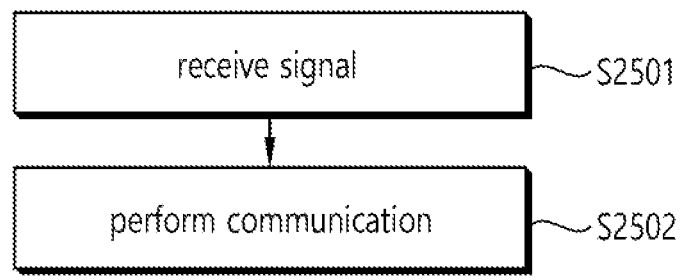
FIG. 25 illustrates a first example of operations of a UE according to an embodiment of the present disclosure.

FIG. 25 illustrates a first example of operations of a UE according to an embodiment of the present disclosure.

FIG. 25 shows an example of operations of the UE. UE may perform operations described in the present specification, even if they are not shown in FIG. 25. Herein, a network may be gNB, base station, serving cell, etc.

FIG. 25 may show an operation of the UE based on descriptions of First Example of the disclosure of the present specification.

In step S2501, the UE may receive signal. The UE may receive SL signal based on NR operating band n79.

In step S2502, the UE may perform communication. The UE may perform NR Uu communication based on the NR operating band n79. The UE is configured to perform con-current operation for the NR Uu communication and NR SL communication. Reference sensitivity is used for the receiving of the SL signal.

For example, the reference sensitivity is predetermined based on combination of SCS configured for the SL signal and CBW for the SL signal. The reference sensitivity may configured based on examples shown in Table 10 to Table 12.

In FIG. 25, step S2501 is shown as to be performed first and step S2502 is shown as toe be performed after S2501. However, the scope of the present disclosure of the specification is not limited to an example shown in FIG. 25. For example, step S2501 and S2502 may be performed simultaneously, or step S2502 may be performed before step S2502.

The following drawings are prepared to explain a specific example of the present specification. Since the names of specific devices or names of specific signals/messages/fields described in the drawings are provided by way of example, technical features of the present specification are not limited to specific names used in the following drawings.

Figure 26:
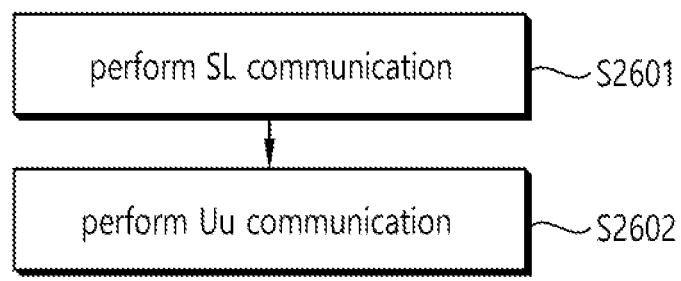
FIG. 26 illustrates a second example of operations of a UE according to an embodiment of the present disclosure.

FIG. 26 illustrates a second example of operations of a UE according to an embodiment of the present disclosure.

FIG. 26 shows an example of operations of the UE. UE may perform operations described in the present specification, even if they are not shown in FIG. 26. Herein, a network may be gNB, base station, serving cell, etc.

FIG. 26 may show an operation of the UE based on descriptions of Second Example of the disclosure of the present specification.

In step S2601, the UE may NR SL communication. The UE may perform switching operation from the NR SL communication to NR Uu communication.

In step S2602, the UE may perform NR Uu communication.

ON power requirement of the UE has not tested for OFF time period. OFF time period is allocated before slot boundary between the first slot and the second slot in time domain. OFF time period is configured based on a switching time required for the switching operation and timing advance configured for the NR Uu communication.

For example, Examples shown in FIG. 15, FIG. 16, FIGS. 17-24 may be applied to the operation of the UE.

Hereinafter, an apparatus (for example, UE) in a wireless communication system, according to some embodiments of the present disclosure, will be described.

For example, the apparatus may include at least one processor, at least one transceiver, and at least one memory.

For example, the at least one processor may be configured to be coupled operably with the at least one memory and the at least one transceiver.

For example, the processor may be configured to perform operations explained in various examples of the present specification. For example, the processor may be configured to perform operations including: receiving a SL signal based on NR operating band n79; and performing NR Uu communication based on the NR operating band n79, wherein the UE is configured to perform con-current operation for the NR Uu communication and NR SL communication, wherein a reference sensitivity is used for the receiving of the SL signal, wherein the reference sensitivity is predetermined based on combination of SCS configured for the SL signal and CBW for the SL signal.

For example, the processor may be configured to perform operations explained in various examples of the present specification. For example, the processor may be configured to perform operations including: performing NR SL communication via first slot; performing switching operation from the NR SL communication to NR Uu communication; and performing the NR Uu communication via second slot after the first slot, wherein ON power requirement of the UE has not tested for OFF time period, wherein the OFF time period is allocated before slot boundary between the first slot and the second slot in time domain, wherein the OFF time period is configured based on a switching time required for the switching operation and timing advance configured for the NR Uu communication.

Hereinafter, a processor for in a wireless communication system, according to some embodiments of the present disclosure, will be described.

For example, the processor maybe configured to perform operations including: receiving a SL signal based on NR operating band n79; and performing NR Uu communication based on the NR operating band n79, wherein the UE is configured to perform con-current operation for the NR Uu communication and NR SL communication, wherein a reference sensitivity is used for the receiving of the SL signal, wherein the reference sensitivity is predetermined based on combination of SCS configured for the SL signal and CBW for the SL signal.

For example, the processor maybe configured to perform operations including: performing NR SL communication via first slot; performing switching operation from the NR SL communication to NR Uu communication; and performing the NR Uu communication via second slot after the first slot, wherein ON power requirement of the UE has not tested for OFF time period, wherein the OFF time period is allocated before slot boundary between the first slot and the second slot in time domain, wherein the OFF time period is configured based on a switching time required for the switching operation and timing advance configured for the NR Uu communication.

Hereinafter, a non-transitory computer-readable medium has stored thereon a plurality of instructions in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions.

For example, the stored a plurality of instructions may be executed by a processor of a UE to perform operations including: receiving a SL signal based on NR operating band n79; and performing NR Uu communication based on the NR operating band n79, wherein the UE is configured to perform con-current operation for the NR Uu communication and NR SL communication, wherein a reference sensitivity is used for the receiving of the SL signal, wherein the reference sensitivity is predetermined based on combination of SCS configured for the SL signal and CBW for the SL signal.

For example, the stored a plurality of instructions may be executed by a processor of a UE to perform operations including: performing NR SL communication via first slot; performing switching operation from the NR SL communication to NR Uu communication; and performing the NR Uu communication via second slot after the first slot, wherein ON power requirement of the UE has not tested for OFF time period, wherein the OFF time period is allocated before slot boundary between the first slot and the second slot in time domain, wherein the OFF time period is configured based on a switching time required for the switching operation and timing advance configured for the NR Uu communication.

Advantageous effects which can be obtained through specific embodiments of the present disclosure. For example, the method for reducing the interference and requirements for the terminal's aspects are proposed. For example, con-current operation of NR SL communication and NR Uu communication may be supported efficiently and/or precisely. For example, ON/OFF time masks or Transient period time masks may be defined considering switching operation based on TDM operation. For example, requirements related to reference sensitivity for intra-band con-current operation may be clearly defined.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A User Equipment (UE) comprising:
at least one transceiver;
at least one processor; and
at least one computer memory operably connectable to the at least one processor and storing instructions that, wherein the at least one processor is adapted to:
receive a Sidelink (SL) signal based on New Radio (NR) operating band n79,
wherein the UE is configured for intra-band con-current NR Vehicle to Everything (V2X) operation with NR uplink and/or NR downlink,
wherein a reference sensitivity is applied for the receiving of the SL signal,
wherein the reference sensitivity is based on combination of subcarrier spacing (SCS) configured for the SL signal and Channel bandwidth (CBW) for the SL signal based on that the SCS of 15 kHz is configured for the SL signal, the reference sensitivity is equal to:
−95.5 dBm, based on that the CBW for the SL signal is 10 MHz,
−92.2 dBm, based on that the CBW for the SL signal is 20 MHz,
−90.4 dBm, based on that the CBW for the SL signal is 30 MHz, and
−89.1 dBm, based on that the CBW for the SL signal is 40 MHz.

2. The UE of claim 1,
based on that the SCS of 30 kHz is configured for the SL signal, the reference sensitivity is equal to:
−95.1 dBm, based on that the CBW for the SL signal is 10 MHZ,
−92.4 dBm, based on that the CBW for the SL signal is 20 MHz,
−90.7 dBm, based on that the CBW for the SL signal is 30 MHz, and
−89.2 dBm, based on that the CBW for the SL signal is 40 MHz.

3. The UE of claim 1,
based on that the SCS of 60 kHz is configured for the SL signal, the reference sensitivity is equal to:
−95.9 dBm, based on that the CBW for the SL signal is 10 MHz,
−92.1 dBm, based on that the CBW for the SL signal is 20 MHz,
−90.9 dBm, based on that the CBW for the SL signal is 30 MHz, and
−89.4 dBm, based on that the CBW for the SL signal is 40 MHz.

4. A method comprising:
receiving a Sidelink (SL) signal based on New Radio (NR) operating band n79; and
wherein a User Equipment (UE) is configured for intra-band con-current NR Vehicle to Everything (V2X) operation with NR uplink and/or NR downlink,
wherein a reference sensitivity is applied for the receiving of the SL signal,
wherein the reference sensitivity is based on combination of subcarrier spacing (SCS) configured for the SL signal and Channel bandwidth (CBW) for the SL signal based on that the SCS of 15 kHz is configured for the SL signal, the reference sensitivity is equal to:
−95.5 dBm, based on that the CBW for the SL signal is 10 MHZ,
−92.2 dBm, based on that the CBW for the SL signal is 20 MHZ,
−90.4 dBm, based on that the CBW for the SL signal is 30 MHz, and
−89.1 dBm, based on that the CBW for the SL signal is 40 MHz.

5. The method of claim 4,
based on that the SCS of 30 kHz is configured for the SL signal, the reference sensitivity is equal to:
−95.1 dBm, based on that the CBW for the SL signal is 10 MHz,
−92.4 dBm, based on that the CBW for the SL signal is 20 MHz,
−90.7 dBm, based on that the CBW for the SL signal is 30 MHz, and
−89.2 dBm, based on that the CBW for the SL signal is 40 MHz.

6. The method of claim 4,
based on that the SCS of 60 kHz is configured for the SL signal, the reference sensitivity is equal to:
−95.9 dBm, based on that the CBW for the SL signal is 10 MHz,
−92.1 dBm, based on that the CBW for the SL signal is 20 MHz,
−90.9 dBm, based on that the CBW for the SL signal is 30 MHz, and
−89.4 dBm, based on that the CBW for the SL signal is 40 MHz.

* * * * *